(12) United States Patent
Ticknor et al.

(10) Patent No.: US 11,061,187 B2
(45) Date of Patent: Jul. 13, 2021

(54) PLANAR LIGHTWAVE CIRCUIT OPTICAL SPLITTER/MIXER

(71) Applicant: NeoPhotonics Corporation, San Jose, CA (US)

(72) Inventors: Anthony J. Ticknor, Cupertino, CA (US); Brian R. West, Hamilton (CA)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 16/407,779

(22) Filed: May 9, 2019

(65) Prior Publication Data
US 2019/0278023 A1    Sep. 12, 2019

Related U.S. Application Data

(62) Division of application No. 15/490,420, filed on Apr. 18, 2017, now Pat. No. 10,330,863.

(51) Int. Cl.
| | |
|---|---|
| *G02B 6/00* | (2006.01) |
| *G02B 6/26* | (2006.01) |
| *G02B 6/42* | (2006.01) |
| *G02B 6/10* | (2006.01) |
| *G02B 6/125* | (2006.01) |
| *G02B 6/122* | (2006.01) |

(Continued)

(52) U.S. Cl.
CPC .............. *G02B 6/125* (2013.01); *G02B 6/126* (2013.01); *G02B 6/1228* (2013.01); *G02B 2006/1215* (2013.01)

(58) Field of Classification Search
CPC ........ G02B 6/1228; G02B 6/12; G02B 6/125; G02B 6/126; G02B 2006/12097; G02B 2006/12147; G02B 2006/1215; G02B 6/2821

USPC ....... 385/11, 14, 15, 31, 39, 41–45, 50, 129, 385/132

See application file for complete search history.

(56) References Cited

U.S. PATENT DOCUMENTS

| | | | |
|---|---|---|---|
| 5,463,705 A | 10/1995 | Clauberg et al. | |
| 5,586,209 A | 12/1996 | Matsuura et al. | |

(Continued)

FOREIGN PATENT DOCUMENTS

| | | |
|---|---|---|
| CN | 105116491 A | 12/2015 |
| JP | 2534445 B2 | 9/1996 |

(Continued)

OTHER PUBLICATIONS

Sugita et al., "Very Low Insertion Loss Arrayed-Waveguide Grating with Vertically Taper Waveguides," IEEE Photonics Technology Letters 12(9) Sep. 2000, pp. 1180-1182.

(Continued)

*Primary Examiner* — Kaveh C Kianni
*Assistant Examiner* — Hung Q Lam
(74) *Attorney, Agent, or Firm* — Christensen, Fonder, Dardi & Herbert PLLC; Peter S. Dardi; Peder Jacobson

(57) ABSTRACT

Planar waveguide junctions are described with a waggled transition section connecting input waveguide sections with output waveguides sections, in which the waggled transitions have alternating segments matching the input waveguide and output waveguides to efficiently transition the optical signal. The planar waveguide junctions can be used to form efficient optical splitters, mixers, or taps.

16 Claims, 13 Drawing Sheets

(51) Int. Cl.
　　　*G02B 6/126*　　　(2006.01)
　　　*G02B 6/12*　　　(2006.01)

(56) References Cited

U.S. PATENT DOCUMENTS

| | | | |
|---|---|---|---|
| 5,745,618 A * | 4/1998 | Li | G02B 6/12011 385/37 |
| 5,757,995 A | 5/1998 | Chen et al. | |
| 6,003,222 A | 12/1999 | Barbossa | |
| 6,058,233 A | 5/2000 | Dragone | |
| 6,553,164 B1 | 4/2003 | Ono et al. | |
| 6,615,615 B2 | 9/2003 | Zhong et al. | |
| 6,697,552 B2 | 2/2004 | McGreer et al. | |
| 6,853,769 B2 * | 2/2005 | McGreer | G02B 6/105 385/10 |
| 6,892,004 B1 | 5/2005 | Yu | |
| 6,892,404 B2 | 5/2005 | Harbin et al. | |
| 7,006,729 B2 | 2/2006 | Wang et al. | |
| 7,103,247 B2 * | 9/2006 | Yamazaki | G02B 6/1228 385/39 |
| 7,160,746 B2 | 1/2007 | Zhong et al. | |
| 7,343,071 B2 | 3/2008 | Laurent-Lund | |
| 7,609,918 B2 | 10/2009 | Narevicius | |
| 2002/0159696 A1 | 10/2002 | Yamaguchi et al. | |
| 2003/0194181 A1 | 10/2003 | Dragone | |
| 2004/0190830 A1 | 9/2004 | Rasras | |
| 2005/0207705 A1 | 9/2005 | Laurent-Lund | |
| 2005/0254750 A1 | 11/2005 | Narevicius | |
| 2013/0195404 A1 | 8/2013 | Boulanger et al. | |
| 2013/0330042 A1 | 12/2013 | Nara et al. | |
| 2016/0377814 A1 | 12/2016 | Ma | |

FOREIGN PATENT DOCUMENTS

| | | |
|---|---|---|
| KR | 10-2000-0039804 A | 7/2000 |
| WO | 2016-071345 A1 | 5/2016 |

OTHER PUBLICATIONS

Sakamaki et al., "Low-Loss Y-Branch Waveguides Designed by Wavefront Matching Method," Journal of Lightwave Technology, 27(9) May 2009, pp. 1128-1134.
International Search Report and Written Opinion for related international application No. PCT/US2018/027754 dated Aug. 7, 2018 (15 pages).
Office Action for corresponding Chinese Application No. 201880037966.9 dated Sep. 18, 2020.
Gamet et al., "Field Matching Y-branch for Low Los Power Splitter", Optics Communications, vol. 248, pp. 423-429, (2005).
Search Report for corresponding European Patent Application No. 18787064.7, dated Dec. 7, 2020.

* cited by examiner

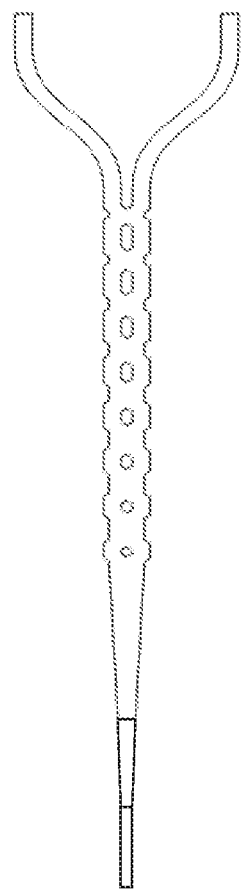 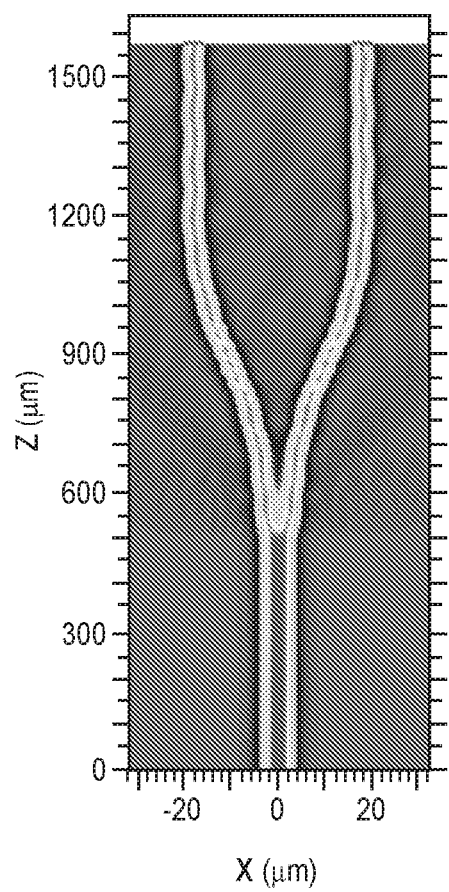 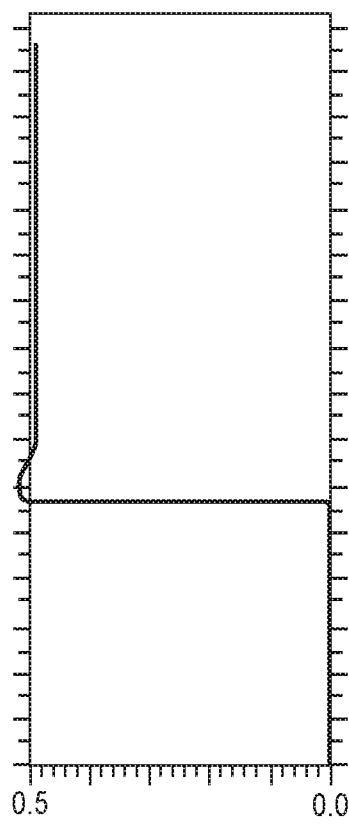
FIG. 16          FIG. 15          FIG. 17

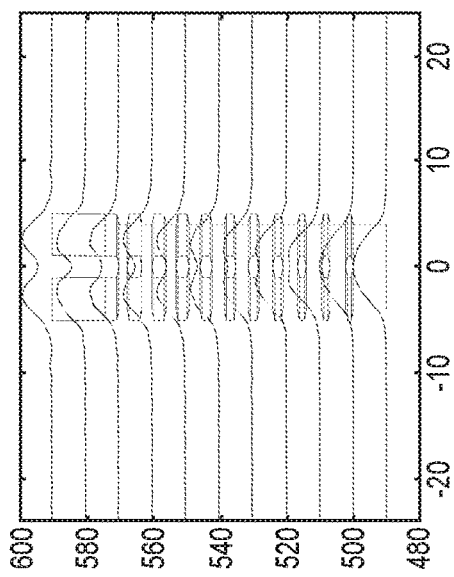
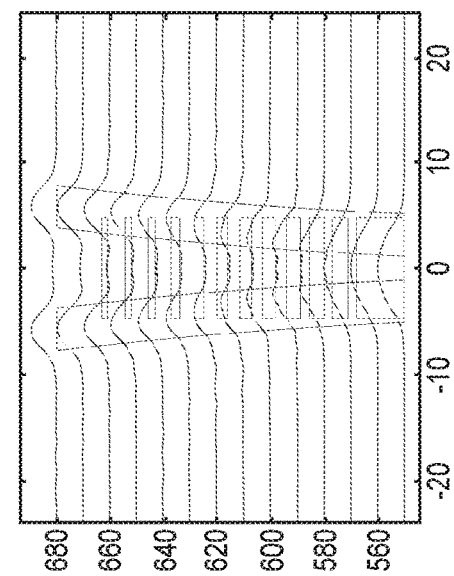
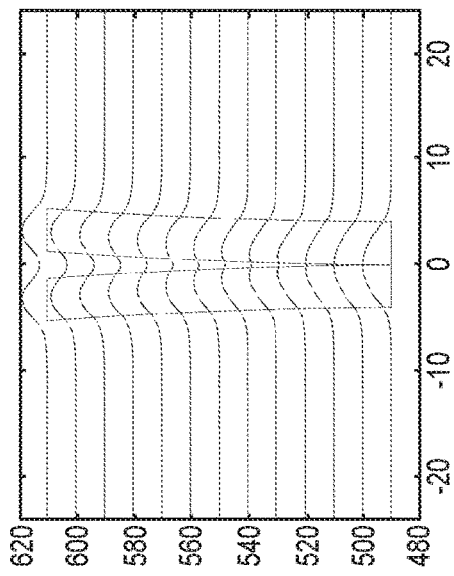
FIG. 19C
FIG. 19B
FIG. 19A

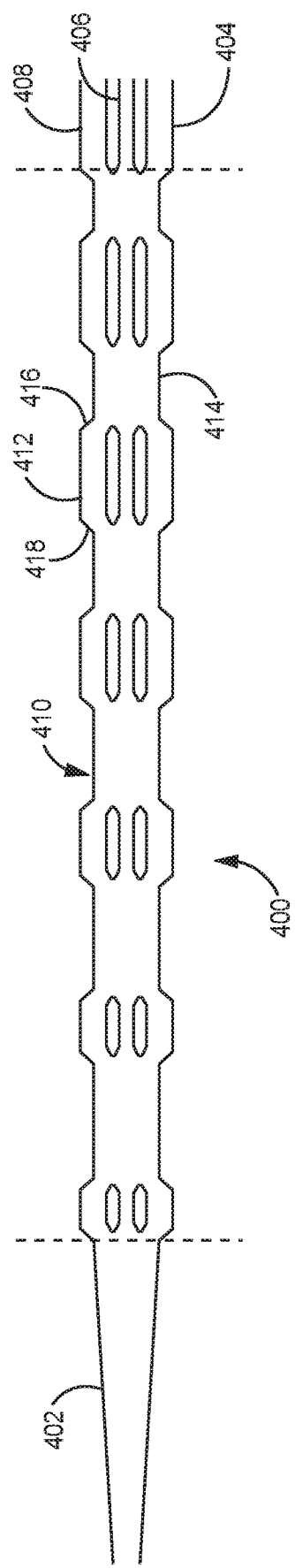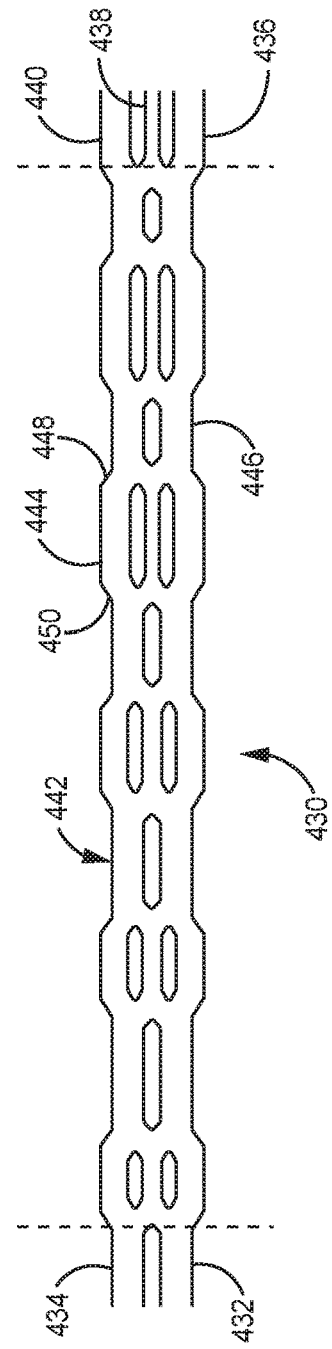
FIG. 25
FIG. 26

PLANAR LIGHTWAVE CIRCUIT OPTICAL SPLITTER/MIXER

CROSS REFERENCE TO RELATED APPLICATIONS

This application is a divisional to copending U.S. patent application Ser. No. 15/490,420 filed on Apr. 18, 2017 to Ticknor et al., entitled "Planar Lightwave Circuit Optical Splitter/Mixer," incorporated herein by reference.

FIELD OF THE INVENTION

This invention relates low optical loss passive optical coupler/splitter for a planar lightwave circuit. The invention further relates to methods for forming planar lightwave circuits comprising low loss optical couplers.

BACKGROUND

Planar Lightwave Circuit (PLC) technology has become the dominant technology platform for the integration of existing and new optical-assembly functions into chip-based silica-waveguide integrated optical circuits. See, for example, K. Okamoto (2010), "Fundamentals of Optical Waveguides" (Academic Press), incorporated herein by reference for basics of optical waveguide technology and formation of planar lightwave circuits. Y-Branch waveguides are an important integrated-optic circuit element in a broad range of optical circuits. Y-Branch waveguides are used to distribute the optical signal from a single waveguide into two separate waveguides (a 'splitter'); or to recombine two optical signals (according to interference principles) that have propagated along separate paths (a 'combiner'). This 1×2 nature of the Y-Branch waveguide is expanded to greater splitting or combining ratios by integrated cascading of Y-Branch circuit elements.

Optical waveguides do not 'contain' the propagation of optical signals as wires contain the propagation of electrical signals. Waveguides merely influence the propagation of optical signals along or nearby their paths. Imperfections in the waveguide structure generally result in some of the light of the optical signal merely propagating away from the waveguides. This results in a reduction of energy in the guided optical signals and diminished signal integrity. It is therefore a significant design objective of such waveguide circuit elements that they have as little excess loss as possible. Since Y-Branch elements are often cascaded to generate larger manifolds, even a small percentage of loss in each Y-Branch can lead to undesirable circuit loss.

Optical networks generally comprise transmission components that are designed to transmit bands of wavelengths over reasonable distances. The bands of wavelengths generally comprise signals intended for a plurality of customers/users. Thus, a single optical fiber can be used to simultaneously transmit a plurality of signals that are subsequently divided for delivery. Similarly, individual signals are combined for transmission over common lines prior to eventual division for routing and/or delivery. Individual bands thus are divided into smaller wavelength ranges corresponding to signals relating to individual users, including aggregations of a few users, and multiplexing and de-multiplexing functions can be used to convert between combined signals for common lines and individual signals for routing and/or interfacing with individual users. Planar lightwave circuits are generally used effectively for many optical functions used for wavelength division multiplexing.

SUMMARY OF THE INVENTION

In a first aspect, the invention pertains to a planar waveguide junction comprising at least one input waveguide section, at least two output waveguide sections and a transition waveguide section optically connecting the at least one input waveguide section and the at least two output waveguide sections. The transition region can comprise alternating gapped segments and ungapped segments along the optical path. The gapped segments have transverse to the optical path waveguide core segments corresponding to the at least two output waveguide sections separated by gaps in the optical core, and the ungapped sections have transverse continuous core having a total width within ±25% of the total sum of transverse width of the core at the gapped segments. The transition section can have at least 3 gapped segments and at least 3 ungapped segments.

In a further aspect, the invention pertains to an optical mixer comprising a) a curved waveguide comprising an input waveguide section, a coupling section and a terminating section; and b) a Y-splitter positioned to optically couple to the curved waveguide at the coupling section. The Y-splitter can comprise an input waveguide section, a transition section, a first output section and a second output section, in which the transition section optically connects the input waveguide section with the first output waveguide section and the second output waveguide section. Generally, the input section comprises a taper from an initial width of w to a tapered with of 2w+g. The taper can be configured for optical coupling with the curved waveguide such that a zero order mode in the curved waveguide couples into a first order mode in the input waveguide section, and wherein the transition section comprises alternating gapped segments and ungapped segments along the optical path, the gapped segments having transverse to the optical path waveguide cores corresponding to the two output waveguide sections separated by gaps in the optical core, and the ungapped segments having transverse continuous core.

The optical mixer can be used in method for controlling optical signal output, in which the method comprises combining two optical signals and directing the combined optical signal into the transition region to direct selected optical signals into the first output section and the second output section based on the phase relationship of the two optical signals. Generally, to form the combined optical signal, a first optical signal is in a zero order mode and a second optical signal is in a first order mode to provide for interference of the two optical signals within the input section of the Y-splitter to form the combined optical signal. The method can be used to achieve variable optical attenuation, optical switching, or polarization beam splitting. With respect to polarization beam splitting embodiments, a first polarization of the first optical signal arrives at the mixer 180 degrees out of phase with respect to the corresponding polarization of the second optical signal, and a second polarization of the first optical signal arrives at the mixer in-phase with respect to the corresponding polarization of the second optical signal.

In another aspect, the invention pertains to an asymmetric optical junction comprising an input waveguide section, a first output waveguide section, a second output waveguide section and a transition waveguide section connecting the input waveguide section and the output waveguide sections, in which the first output waveguide section has a width perpendicular to the optical path at the transition section that is at least about 10% greater than the corresponding width of the second output section. Generally, the transition section comprises alternating gapped segments and ungapped segments along the optical path, the gapped segments having transverse to the optical path waveguide cores corresponding to the two output waveguide sections separated by gaps in the optical core, and the ungapped segments having transverse continuous core.

BRIEF DESCRIPTION OF THE DRAWINGS

FIG. 15 is a simulation plot showing the splitting field intensity of an optical signal obtained with a 1×2 optical splitter with a waggled transition.

FIG. 16 is a top plan view of a 1×2 optical splitter with a waggled transition, shown with the waggled transition in exaggerated size for clear viewing of the waggle.

FIG. 17 is a plot of optical mode intensity as a function of position along one output waveguide for the simulation of FIG. 15.

FIG. 18A for the splitter of FIG. 4 (results from FIGS. 5 and 6), FIG. 18B for the splitter of FIG. 7 (results from FIGS. 8 and 9), and FIG. 18C for the splitter of FIG. 16 (results from FIGS. 15 and 17).

FIGS. 19A-19C is a set of plots of optical amplitudes as a function of position depicting the split of the optical intensity into peaks for the split waveguides with a side-by-side comparison:

FIG. 19A for the splitter of FIG. 4, FIG. 19B for the splitter of FIG. 7, and FIG. 19C for the splitter of FIG. 16.

FIG. 21A for the splitter of FIG. 4, FIG. 21B for the splitter of FIG. 7, and FIG. 21C for the splitter of FIG. 16, which contrast with the previous figures based on zero-order-mode optical input signals.

FIG. 25 is a top plan view of a 1×3 splitter with a waggled transition section.

FIG. 26 is a top plan view of a 2×3 combiner with a waggled transition section.

For the device figures above, these can be considered fragmentary views in the sense that input and output waveguide sections continue for integration into a planar lightwave circuit (PLC) structure. Generally, for some embodiment, the waveguides continue to reach a constant width for the mode intended for transmission, although an optional exception for tap embodiments is described below.

DESCRIPTION OF THE INVENTION

Optical couplers with improved performance are described having a transition section connecting N input waveguide sections with M output waveguide sections that decreases optical loss resulting from non-ideal behavior around the junction joining the branched waveguides. In this discussion, we refer to the present design as a 'waggled' waveguide transition. The English-language definition of 'waggle' includes "to move side to side in a short, rapid manner". In the present coupler structures, the two (or more) separate waveguides shift side-to-side in and out over a relatively short propagation distance covering a transition region. The transition region spans between a first waveguide structure, such as a single broadened waveguide, and a second waveguide structure, such as a two split waveguides, although alternative transitions are further described below. Resulting structures are found to have lower amounts of optical loss resulting from the splitting of an input waveguide into output waveguides. In alternative embodiments, a corresponding waggled transition can be used for an asymmetric transition, a 1×3 transition, a 2×3 transition or other transitions. The waggled transitions are found to be particularly effective for forming optical taps. The splitters/couplers can be integrated into a planar lightwave circuit (PLC) alone or with additional optical components. PLC processing technology to form the structures are described.

The descriptions and improved splitters/couplers described herein are applicable across a very broad range of waveguide parameters. A representative example would be: (i) refractive index of the core 1.5% higher than the surrounding material; (ii) waveguide thickness is roughly 4 microns; (iii) nominal waveguide width (before taper, or after split) is roughly 4 microns; and (iv) minimum formable gap between waveguides of roughly 2 microns. To facilitate progression and comparison, these example parameters, which are suitable for silica glass waveguides, are used throughout for discussions, configurations, and simulations, although the devices based on the teachings herein are not limited to these example parameters. A person of ordinary skill in the art can scale the structures accordingly for different suitable parameters, such as a higher index of refraction difference, different waveguide dimensions for different optical frequencies, different optical materials, or other design issues known in the art.

Figure 1:
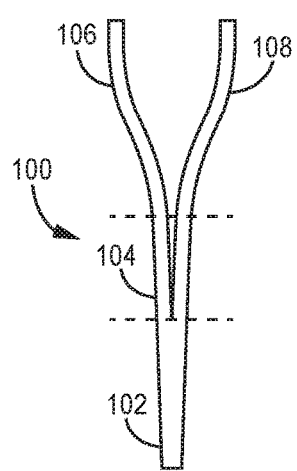
FIG. 1 is a top plan view of the core of an ideal 1×2 optical splitter in a planar structure.
Figures 2, 3:
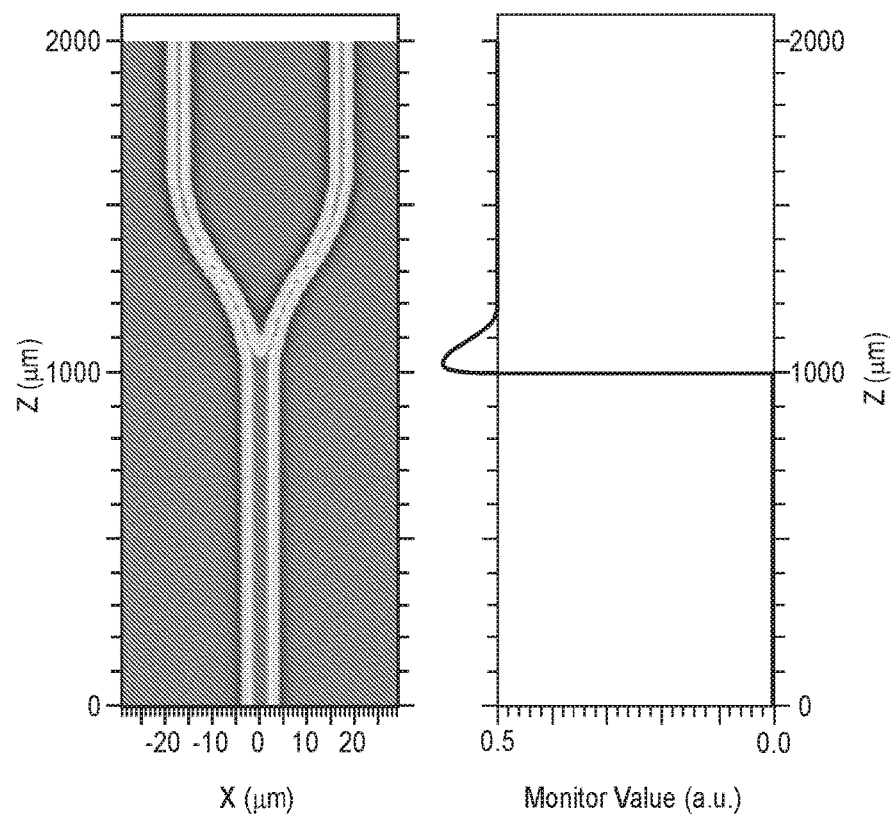
FIG. 2 is a simulation plot of the optical field intensity for the ideal 1×2 splitter of FIG. 1 in which the simulation is depicting the splitting of optical intensity from the single waveguide into the split waveguide.
FIG. 3 is a plot of the simulated optical mode intensity as a function of position along the waveguide within one of the split waveguides of FIG. 1 normalized to the total optical intensity.

An idealized Y-branch splitter 100 is depicted in FIG. 1. The physical layout of the ideal splitter in FIG. 1 is not to scale as the length along the propagation direction (vertical in the figure) would be much longer than depicted compared to the transverse width (horizontal in the figure). Idealized Y-branch splitter 100 comprises a single waveguide section 102, transition waveguide section 104, first split waveguide section 106 and second split waveguide section 108. In this diagram, a single waveguide section starting at the bottom gradually widens to about twice its width, then splits into two waveguide sections that gradually separate for some distance, then separate more quickly after the two waveguides have become sufficiently independent. The precise boundary of transition waveguide section 104 at the split waveguide end can be selected based on the optical properties and does not need to be precisely defined. But once the optical signals are localized in the split waveguides, the waveguides are appropriately considered as the split waveguides. This configuration closely resembles the letter 'Y', and hence is commonly referred to as a Y-Branch splitter (or combiner). FIG. 2 shows the numerical simulation of optical propagation through the ideal Y-branch structure of FIG. 1 from bottom to top in the orientation depicted in the figure. This simulation and the correspondingly similar simulations provided herein are based on the well-known "beam propagation method" (BPM). FIG. 2 shows the electric field intensity which is shown to be concentrated along the core of the waveguide with the signal smoothly transitioning into the split waveguides along the transition region. This shows that the ideal Y-Branch efficiently and equally divides the optical power into the two branches.

The plot of FIG. 3 shows the calculated fraction of the input power (normalized to 1) coupled into the individual output waveguides from the numerical simulation. The value is zero before the split because there are no output waveguides there. When the output waveguide sections first start to split, there is not a distinct separation between them and for a short distance the power cannot be calculated accurately. Therefore, the measured power temporarily exceeds the 0.5 (50%) maximum power for each waveguide. As the waveguides more distinctly separate, the power measurements accurately reflect what is being simulated. Once the split waveguides are identifiable, the light intensity in each output arm of the ideal splitter is essentially equal to the 50% theoretical maximum, hence the identification of the splitter as 'ideal'.

Figure 4:
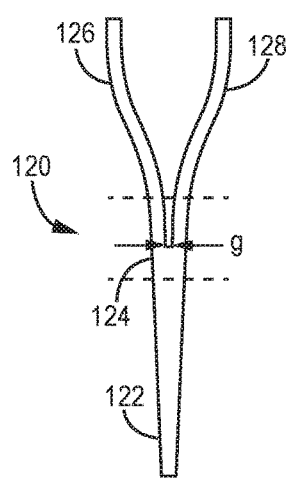
FIG. 4 is a top plan view of the core of a practically produced approximation to the ideal splitter of FIG. 1 with the sharp tapered gap replaced by an edge conforming to the gap.

There are numerous practical reasons that PLC technology has become the dominant commercial technology for passive integrated optics, but using practical fabrication techniques, PLC technology is not capable of making an ideal splitter as depicted in FIG. 1. This is because the waveguide is a 3-dimensional structure that is approximately as deep as it is wide. As such, it is not possible to accurately create the deep, narrow gap sharply tapering between the waveguides where they first start to separate. PLC waveguide design using practical fabrication techniques requires a 'minimum gap' between waveguides, so in the Y-branch, the single waveguide must further expand until it is as wide as both output waveguides plus the minimum gap before the output waveguides can begin. A practical Y-branch splitter 120 adapted from the ideal splitter is depicted in FIG. 4, in which the resulting waveguide layout has an achievable gap between the waveguides. Y-branch splitter 120 comprises input waveguide section 122, transition waveguide section 124, first split waveguide segment 126 and second split waveguide section 128. The transition waveguide section has an edge marked on the side of input waveguide section 122 at a point where the width is 2 w, where w is the nominal long distance waveguide width. Again, the edge of transition waveguide section 124 toward the split waveguide sections is not particularly significant except that once the signals are well localized in the individual waveguides it is appropriate to consider the waveguides as split. The finite gap is marked "g" in FIG. 4.

Figures 5, 6:
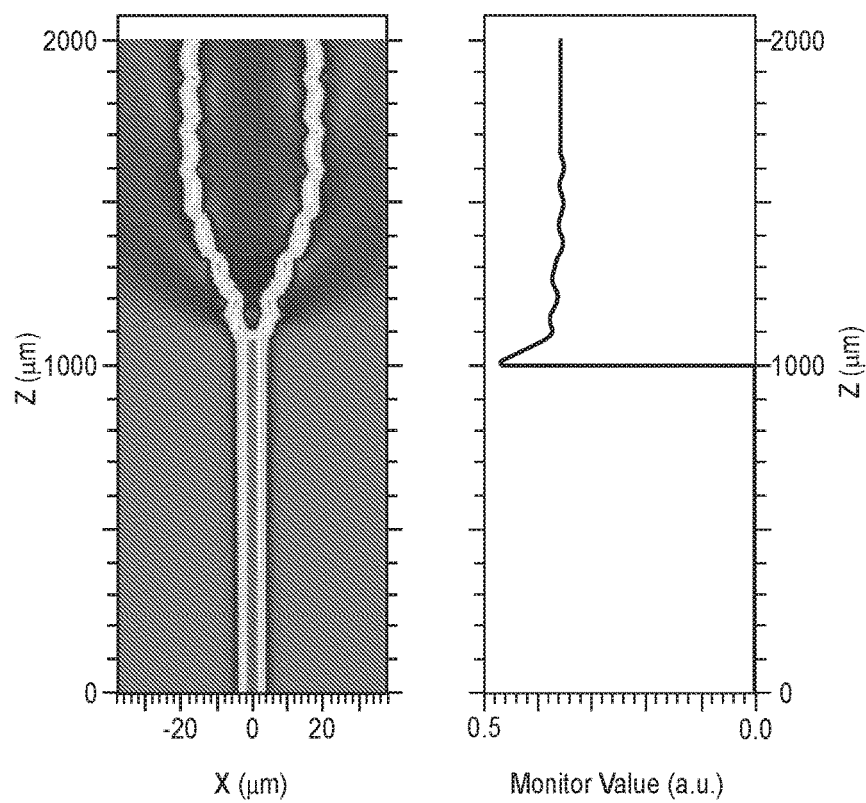
FIG. 5 is a simulation plot of the optical field intensity for the 1×2 splitter of FIG. 4.
FIG. 6 is plot of simulated optical mode intensity as a function of position along the waveguide within one of the split waveguides of FIG. 4 normalized to the total optical intensity.

FIG. 5 depicts the electric field intensity from a BPM simulation of optical propagation through the structure of FIG. 4 according to the example parameters above. From FIG. 5, it can be readily seen that the optical propagation is notably disrupted by the finite gap, g. This observation is confirmed in FIG. 6 showing the fraction of the normalized light input power that substantially less than the ideal 50% is coupled into each of the output waveguides, the rest being lost into the surrounding medium.

The optical losses resulting from realistic approximation to the ideal Y-branch splitter is known and discussed in references with proposed improvements of varying practicality and effectiveness. Matsuura et al. for instance describes the basic issue and suggests modifications of the waveguide tapers to improve the efficiency, see U.S. Pat. No. 5,586,209, entitled "Optical Branching Device," incorporated herein by reference. A further description of the signal loss due to Y-branch imperfections and suggestions for using modal interference to improve the coupling efficiency are found in U.S. Pat. No. 5,757,995 to Chen et al., entitled "Optical Coupler," incorporated herein by reference. It has been suggested that the addition of multiple waveguide core paths of progressively decreasing width connected between the outputs following the transition, which is the basis of some fairly effective and commercially implemented improvements. See, U.S. Pat. No. 5,745,618 to Li (hereinafter Li), entitled "Optical Devices Having Low Insertion Loss," incorporated herein by reference in its entirety with particular attention to FIG. 8. Further variations on the structures of Li are described in U.S. Pat. No. 6,892,404 to Yu (FIG. 6 shows a 1×N splitter), entitled "Optical Coupling Arrangement Having Low Coupling Loss and High Production Yield," and U.S. Pat. No. 7,343,071 to Laurent-Lund, entitled "Optical Component and a Method of Fabricating an Optical Component," both of which are incorporated herein by reference. Many of these improvements have significantly improved efficiency relative to the Y-branch splitter of FIG. 4.

Figure 7:
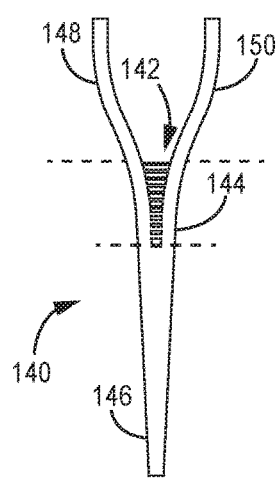
FIG. 7 is a top plan view of the core of an embodiment of an improved optical splitter based on a modification of the splitter design of FIG. 4 with some added structure to assist with the splitting of the optical intensity.

FIG. 7 shows the waveguide layout for a Y-branch splitter 140 in the spirit of the improvements suggested by Li and others, adding progressively thinner bridges 142 of core material forming a transition waveguide section 144 from an input waveguide section 146 to the diverging waveguides 148, 150. Referring back to FIG. 2 showing the simulation of the ideal Y-Branch, one can see that in the region where there is only a very small gap between the waveguides (the portion of the structure that is impractical to fabricate), the optical intensity profile that is originally peaked along the center of the lower portion of the Y-branch splits into two peaks along region with a sub-resolution separation so that there are dual peaks to couple into the two distinct upper sections of the Y-branch. This phenomenon can be considered essentially why the ideal Y-branch is ideally efficient, coupling a full 50% of the optical signal from the lower arm into each of the two upper arms in this example. Referring further to the simulation of the practical Y-branch plotted in FIG. 5, one sees that there is no transition from a single central peak in the lower arm into a dual peak before reaching the distinctly-separate upper arms. This is primarily why efficient coupling in the base practical Y-branch is substantially degraded. A simulation of a Y-branch improved in the spirit of Li and others as shown in FIG. 7 is plotted in FIG. 8. Here one can see that these improvements still do not provide a splitting of the intensity peak prior to the upper arms that is a key characteristic of the idealized Y-branch.

Figures 8, 9:
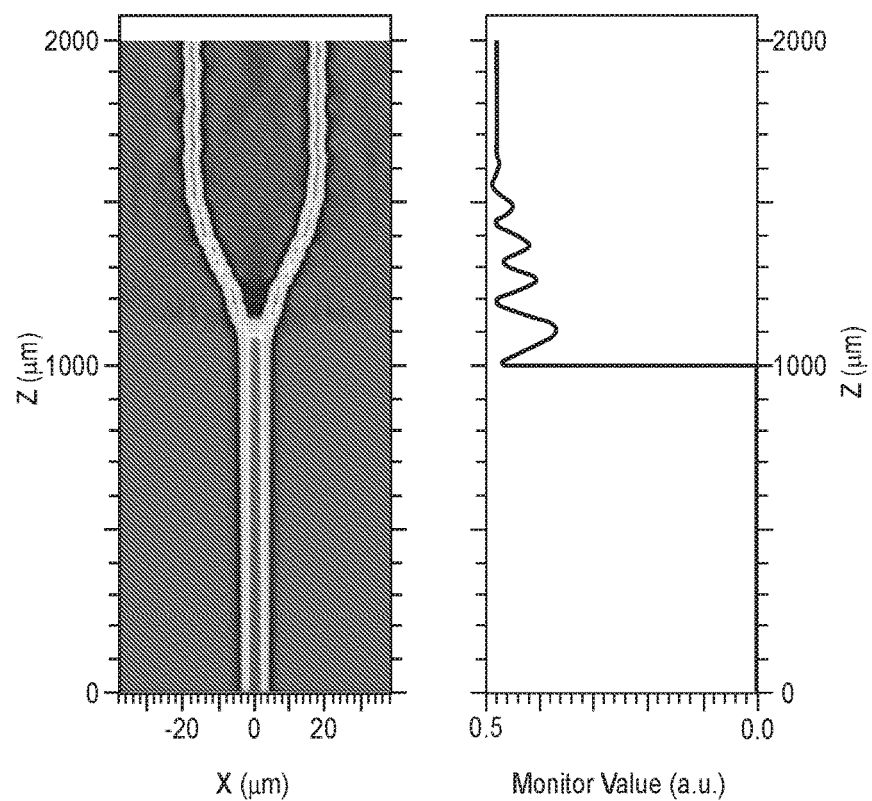
FIG. 8 is a simulation plot of the optical field intensity for the 1×2 splitter of FIG. 7.
FIG. 9 is a plot of optical mode intensity as a function of position along the waveguide within the splitter design of FIG. 7 normalized to the total optical intensity.

In FIG. 4, lacking the improvements shown in FIG. 7, the centrally-peaked optical signal of the lower arm encounters the finite gap between the upper arms and a significant component of the light propagates out into the gap between the upper arms. According to the fundamental nature of waveguides, the refractive index between the upper arms is necessarily lower than the refractive index of the waveguide cores. Therefore, the fraction of the light propagating into the gap moves ahead of the fraction of light coupling into the guided modes of the upper arms. This distorts the optical wavefront and figuratively reduces the chances of that central fraction of light recoupling to the optical signals propagating in the upper arms, leading to the excess loss and reduced coupling efficiency. A simplified explanation of the improvements shown in FIG. 7 is that the bridges appropriately slow down the central light trying to propagate in the gap and improve the likelihood for that central light to couple back to the optical modes in the upper arms. In this sense, and in reality, these improvements in the embodiment of FIG. 7 do not seek to 'fix' the lack of splitting in the central peak, but more to reduce the resulting effects and to some extent to guide the light intensity back into the waveguides. These effects can be seen in FIG. 9 plotting the light coupled into the upper arms with this splitter improvement. One can readily see an oscillation of the guided-mode energy in the upper arms even beyond the range of the added bridges. This is modal 'sloshing' as the guided mode and the lateral light try to coordinate into a composite guided mode. Configurations of these particular type of improvements can increase the efficiency of a practical Y-Branch to within roughly 95% of ideal, but there remains room for valuable further improvements in efficiency, stability, process qualities, and other features. In the context of a slab waveguide for an arrayed waveguide grating, which has conceptual overlap with the splitters described herein, Sugita et al. describe a variation of this approach that substitutes a core element of tapering thickness (the thickness dimension being the third dimension not depicted in the figures) for the bridges. See Sugita et al., "Very Low Insertion Loss Arrayed-Waveguide Grating with Vertically Taper Waveguides," IEEE Photonics Technology Letters 12(9) September 2000, pp. 1180-1182, incorporated herein by reference. One would expect this to provide similar or slightly-improved results to the bridges, but at significantly increased fabrication time and cost.

Various approaches have been tried to emulate the modal splitting in the lower arm of an idealized Y-branch splitter. For example, Sakamaki et al. suggest a computer-optimized multiple random variations of waveguide width along the lower arm in order to yield a splitting of the central peak. See, Sakamaki et al., "Low-Loss Y-Branch Waveguides Designed by Wavefront Matching Method," Journal of Lightwave Technology, 27(9) May 2009, pp 1128-1134, incorporated herein by reference. The wavefront matching approach of Sakamaki is certainly promising in principle, but require a delicate balancing of design parameters and present significant challenges in faithfully translating those balanced numerical designs into practically-fabricated waveguide elements.

While attempts have been made to reduce optical loss in Y-branch splitters for practical designs, the Y-branch designs herein provide an alternative approach to an improved Y-branch waveguide junction with certain distinct advantages. The present Y-branch designs can also be applied to other types of waveguide-splitting junctions that are not well addressed by the other alternative approaches discussed above, such as optical taps described below.

For the purpose of the discussions herein unless explicitly stated otherwise, the term 'input' refers to the waveguide(s) or portions and/or optical signals coming from the side of the device with fewer physical waveguide channels (e.g. the single arm side of a Y-branch), and the term 'output' refers to the waveguides or portions thereof and/or optical signals on the side of the device with a greater number of physical optical channels (e.g. the laterally-separated arms of a Y-branch). Since these splitters are passive, optically linear devices, it is well understood by all familiar with the art that an improvement provided for optical transmission from input to output would also provide a corresponding improvement (with due consideration of optical interference) for light propagating from the output to the input. Therefore, the selection of the terms 'input' and 'output' are only meant to facilitate a more comprehensible description and do not imply a required orientation of the propagation direction. Similarly, the orientations in the figures are for illustration purposes, and actual devices can be oriented for the particular applications, and generally for asymmetric devices, mirror images of the devices with reversed orientations are correspondingly covered by the disclosure.

Figure 10:
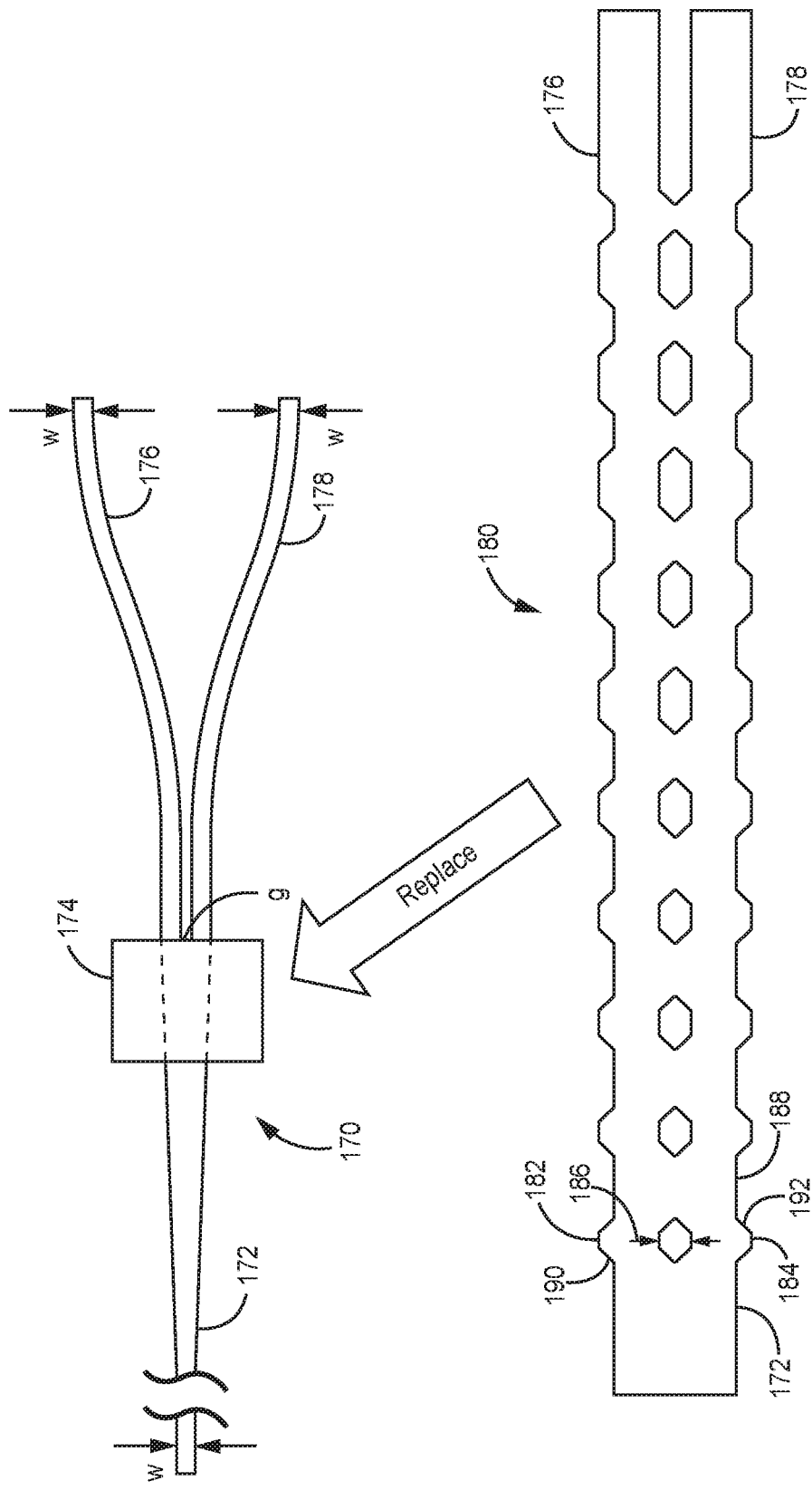
FIG. 10 is a fragmentary top plan view of a 1×2 optical splitter in which a transition region, such as shown in FIG. 4, is replaced with a waggled transition section shown in the bottom view in an expanded, separated view.

The basic principle of the present Y-branch innovation is presented in FIG. 10. As generally accepted for patent drawings especially on a microscopic scale, the drawings are not to a uniform scale, either transverse-to-longitudinal, nor between different longitudinal sections to provide for better visualization. Referring to FIG. 10 upper view, Y-branch splitter 170 comprises a single waveguide segment 172 on an input side of the device, a transition section 174, a first split waveguide 176 and a second split waveguide 178, in which split waveguides 176, 178 are on the output side of the device based on the terminology above. In this embodiment, the input waveguide can be considered to have an initial width of 'w', and each output waveguide can also be considered to also have a width of about 'w', with the gap between the output waveguides expressed as 'g'. In an ideal (unrealizable) splitter (as per FIG. 1), the input waveguide would gradually taper up to a width of 2×w, then the two output waveguides each of width w would split and eventually separate. In the basic practical splitter (as per FIG. 4), the input taper would gradually continue until reaching a width of 2*w+g, whereupon two distinct output waveguides of width w separated by the minimum practical gap, g, proceed to separate. In the present designs, a transition section is replaced where the taper goes from a width of 2*w to a width of 2*w+g (the shaded region in the upper part of FIG. 10). Specifically, the transition section of taper is replaced by a "waggled" waveguide transition section 180 as represented by the lower drawing of FIG. 10.

In this example, the waggled transition 180 has an initial width of about 2w, then abruptly shifts to 2 waveguide segments 182, 184 each of width w separated by a gap 186 of g, forming what can be termed a gapped segment. After a very short distance it 'wags' back to a single waveguide 188 of width 2w, forming what can be termed an ungapped segment. Connecting segments 190, 192 connect waveguide sections 182, 184 of the gapped segment with the single waveguide segment 172 and the ungapped segment 188, respectively. In the lower diagram of FIG. 10, only the first cycle is provided with reference numbers to simplify the diagram, but it is understood that the cycles repeat as summarized with in this embodiment a total of 10 wags being depicted. The gapped segments resemble the output waveguide section adjacent the transition section, and the ungapped segments resemble the input section adjacent the transition section. The embodiment in FIG. 10 is a desirable practical embodiment, but more general design considerations are discussed next with this specific embodiment as appropriate background.

This alternation of double and single waveguide sections can repeat several times, in each subsequent cycle generally, the fraction of length having two separate waveguides can increases and the fraction of length having a single waveguide can decrease, although there can be adjacent wags in which the fraction of lengths can remain approximately the same for one or a few cycles. The total number of alternating segments, shown as 10 wags (10 ungapped segments and 10 gapped segments), can more generally be at least 3 wags, in some embodiments from 4 to about 75 wags in a transition section, in further embodiments from 5 to 50 and in other embodiments from 6 to 25 wages in a transition section. A person of ordinary skill in the art will recognize that additional ranges of wags within the explicit ranges above are contemplated and are within the present disclosure.

A waveguide core generally extends over many hundreds of microns or longer without significant disruption in order to 'guide' a wave. Although it is common and conventional, and correspondingly used herein, to refer to shorter structures of waveguide core as 'waveguides', more precisely they are 'refractive elements', and that distinction should be considered to understand the behavior of the waggled waveguide transition. While not wanting to be limited by the summary simplifications, some observations are made regarding the operation of the devices described herein. The optical signal does not immediately split up and follow the waveguide cores in and out; instead the optical signal reacts to the refractive nature of the pattern. The optical signal in such a structure extends greater in width than the actual structure of the core elements. When the optical signal encounters an element of waveguide core, the portion of the signal passing through the core is refractively delayed a slight amount compared to the portion of the optical signal passing around the core element. This tends to make the wavefront of the optical signal bend inwards around the axis of the core element. A confined optical signal travelling through a medium without such an influence will tend to bend outwards due to basic optical physics. To be most efficient, the desired waveguide transition should accomplish two things: (a) the central peak of the input mode should be smoothly split into two peaks approximately aligning to the output waveguides and separated by a dip; and (b) the wavefront should remain flat so it is neither converging nor diverging. The ideal splitter accomplishes both of these (as a theoretical device) and hence its extraordinary (theoretical) efficiency. The other approaches to reduce optical loss of a Y-branch splitter discussed above prior to the present invention tend not to directly address either of these, or at best only address (a). In fact, the other approaches, e.g., FIG. 7, generally make (b) worse than doing nothing, and clearly it is desirable for improved optical splitting, as available with the embodiment of FIG. 10.

Figure 11:
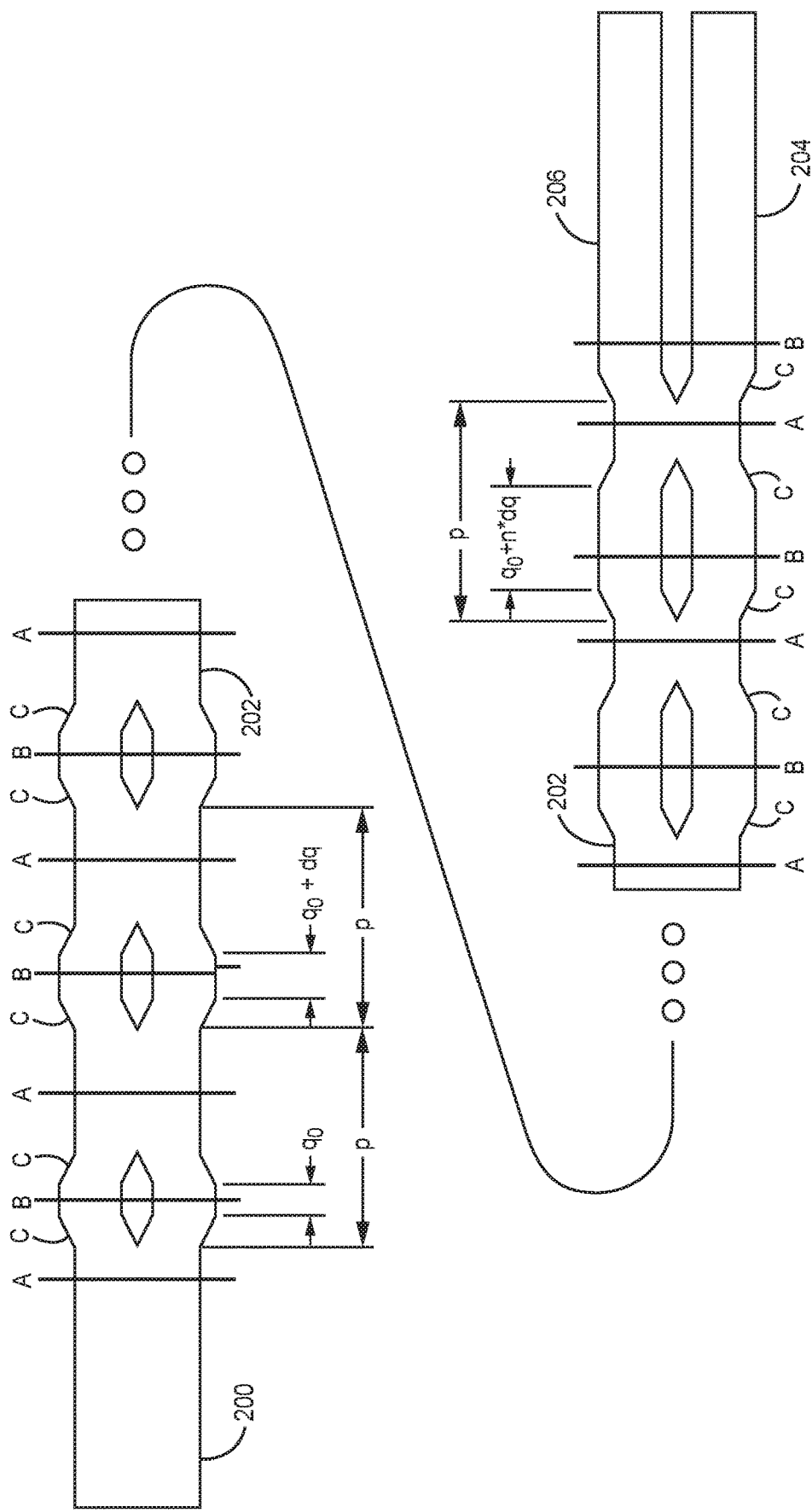
FIG. 11 is a fragmentary view of the waggle transition section of the lower cutout of FIG. 10 with marking to indicate design parameters.

The structure of the waggled transition is further elaborated in FIG. 11. Here a key principle is highlighted in that there is a waveguide 'profile-A' on the input waveguide 200 and a composite 'profile-B' at the interface of transition section 202 to output waveguides 204, 206 collectively forming the profile-B, where both profile-A and profile-B can be practically fabricated. With the figure in mind, the principle of the waggled transition is straightforward: the structure alternates between profile-A and profile-B several times with cycles nearer the input being a larger fraction of length in profile-A and cycles nearer the output having a greater fraction of the length in profile-B. In the transition section 202 having the waggles, the alternative profile segments have connecting sections C between them. The length of each cycle (depicted as 'p') does not need to be constant throughout the transition, and the progression of profile lengths (depicted as n*dq), starting from an initial profile length $q_0$, does not need to be uniform, but should be generally increasing, although not necessarily on every cycle. For the example parameters used herein as presented above, a suitable value for dq would be about 0.25 microns. Thus, suitable performance can be achieved with a wide range of variation in the waggles. In practice, constant 'p' and uniform 'dq' works quite well. Numerical examples for dimensions are provided later in this document where results are discussed.

It may be noticed that FIGS. 10 and 11 depict slanted coupling segments between the profiles. This is not crucial to the basic efficiency of the transition, and other shapes to these connecting segments can be suitably efficient. There are however some other advantages to these slants that will be described shortly. In particular though, processing considerations that result in imperfections to the connecting segments that can be less pronounced with appropriate selection to the connecting segments.

Although not expressed that way, the Y-splitter designs references above of Li, Yu, Laurent-Lund, and similar others could also be expressed as a progressive alternation between profiles. Since the ideal structure of FIG. 1 is not practical, practical structures that can attempt to facilitate the splitting of the optical signal with reduced loss generally involve some form of alternating structures that help to more smoothly split the central peak of the wavefront. But the present designs incorporate two other significant factors (or two aspects of a single significant factor) that underpin the efficiency of the designs herein. One design aspect is that the total amount of core across profile-A, e.g., an ungapped segment, is approximately equal to the total amount of core across profile-B, e.g., a gapped segment. The desirable results can relax this condition such that in some embodiments, the core across profile-A can be within ±25% of the core structure across profile-B, in further embodiments within ±15%, in additional embodiment ±10% and in other embodiment ±5% of the core structure across profile-B. Similarly, the core width across the profile-A and profile-B segments can have minor variations across transition section from segments of the same type within the same ranges, ±25%, ±15%, ±10%, ±5%. For the design parameters presented above having a gap of 'g', the extent of the alternating segments in the propagation direction (parameter "p" in FIG. 11) can generally range from about 2*g to about 30*g, in further embodiments from about 3*g to about 25*g, and in additional embodiments from about 4*g to about 20*g. As noted above, the profile-A segments start at the input side larger in extent in the propagation direction than the profile-B segments, but gradually the profile-A segments get smaller in extent in the propagation direction while the profile-B segments get larger. A person of ordinary skill in the art will recognize that additional ranges of relative core amounts across the profiles and extents of the profiles in the propagation direction within the explicit ranges above are contemplated and are within the present disclosure.

Recall that above, the core structures were referred to as refractive elements and that they induced a local delay along the optical wavefront. If that delay is over the right extent of area, then the tendency for the optical wavefront to curve inwards from the delay balances the tendency for it to curve outwards from propagation, and the wavefront remains nominally straight. If there is too much core crossing the path, the wavefront can be over-delayed and overall bow inward. If there is too little core crossing, the wavefront can bow outwards. Keeping the total cross-section of core across the central region of the wavefront approximately constant helps to keep the wavefront straight, providing access to higher efficiency and reduced noise ('sloshing') in the output waveguides. Note that because of the configuration of the slants, the total amount of core in the cross-section remains approximately constant, even as it wags from one profile to the other (one of the advantages of slants). Referring to FIG. 10, in the waggle segment, the holes in the core at the center of the structure are mirrored in the upper and lower appendages to the core with half of the hole filled at the top and the other half of the hole filled at the bottom to keep the amount of core width approximately the same although split. However, generally the optical performance is not strongly dependent on the shape of the connecting segments, which can have a shorter extent in the propagation direction. While the 'silica paths' of Li and the 'transversal waveguide cores' of Laurent-Lund significantly increase the total cross-section of waveguide core over that of their adjacent profile the total width of core material does not remain constant at all in the alternating patterns. The 'segments' described in Yu alternately and substantially increase and decrease the total cross-section of core over the alternating profiles.

Another advantage of the designs herein is a direct consequence of the above approximately constant-total cross-section through the transition zone. The total transverse extent of the core input-like profile-A is less than the total transverse extent of core output-like profile-B (the outer edges of the transition zone have to jut outwards to go from A to B) due to the gap in the profile-B segments. This shift happens since the width of profile-A is roughly 2*w and no gap, while the width of profile-B is roughly 2*w plus a gap. In contrast, both Li and Yu, cited above, teach the input profile that is substantially wider than the extent of output waveguides in order to move the tails of the optical mode further out beyond the extent of the output waveguides. So while Li and Yu teach alternating sections, the profiles are striking different.

Figure 12:
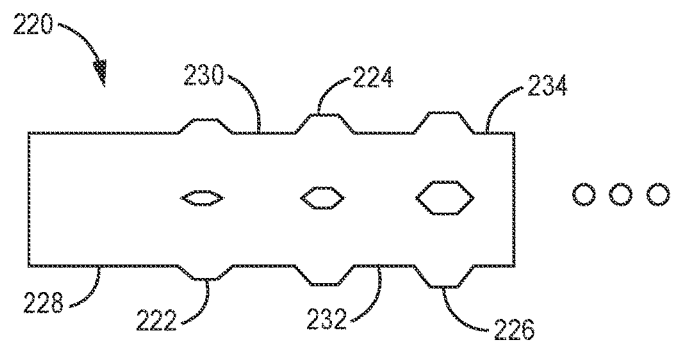
FIG. 12 is a fragmentary view of an alternative embodiment of the waggle transition with a gap growing both transversely and longitudinally.

Consistent with the concept of an approximately constant core cross section through the transition zone, the gap at the profile-B segments can change from the input end to the output end, such as a gradual transition. Referring to FIG. 12, a segment with three wags is shown. Referring the fragmentary view of transition section 220, input section has a width 2w, and profile-B segments 222, 224, 226 have, respectively, gaps $g_1$, $g_2$, $g_3$ with $g_1 < g_2 < g_3$. Profile-A segments 228, 230, 232, 234 are equivalent to corresponding profile-A segments of FIGS. 10 and 11 as well as the input section. The connecting segments change accordingly to account for the changing gaps. Generally, the initial gap can be selected to be the smallest practical gap, and this gap can grow slowly by the end of the transition section. In some embodiments, the gap can be constant for several waggles, and then change, etc.

Figure 13:
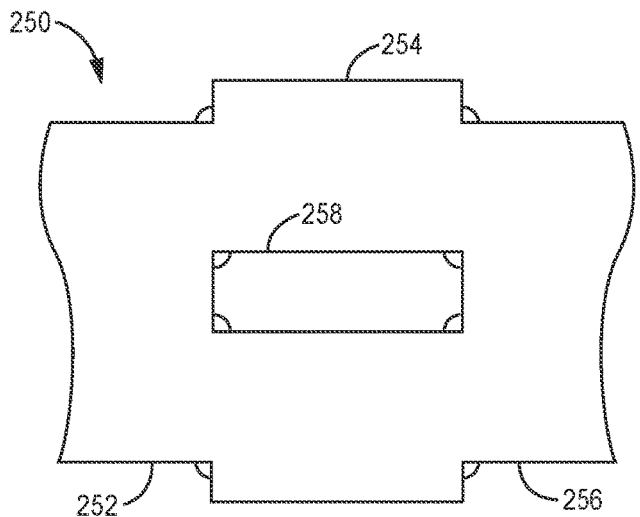
FIG. 13 is a fragmentary view of a single waggle section with an alternative structure with a connection segment removed to form a rectangular gap across the waggle.

FIG. 13 depicts a portion of a waggled transition 250 with no slant between the profiles. In other words, there are approximately no connecting segments between the profile-A segments and the profile-B segments. Referring to FIG. 13, the depicted portion of waggled transition 250 comprises profile-A segment 252, profile-B segment 254 and profile-A segment 256. Profile-B segment 254 has an approximately rectangular gap 258. Simulations predict that a transition region with no slants, i.e., no connecting segments, would couple approximately as efficiently as a connecting segment with the slants, however there are some secondary considerations that can make the slants preferable. More generally, the simulations are not particularly sensitive to the precise shape of the connecting segments, which generally had a longitudinal extent less than the profiled segments. As mentioned above, and depending on how the vertical features line up, it may be easier to establish approximately 'constant total core cross-section' with the slanted interconnections. Secondly, the shaded areas in FIG. 13 depict 90° interior angles that the fabrication process tries to produce. The design rules do allow 90° interior angles at roughly minimum dimensions, but when they are there the fabrication process should be carefully controlled to produce them. In that case, such features may restrict the fabrication process in areas that might otherwise be adjusted to improve other types of features, meaning restricted processing flexibility. Thirdly, the vertical edges depicted in FIG. 13 can reflect small amounts of light back along the input direction. These reflections generally are too small to affect efficiency, but optical systems can be sensitive to even very small amounts of light reflected back along the input. A multi-component optical circuit with each component reflecting back $1/10,000^{th}$ or even $1/100,000^{th}$ of the light could result in a specification failure. In some embodiments, the connecting segments has an extent along the propagation direction of the waveguides generally no more than 25% of the smallest transverse extent of the profiled segments or 50% of the gap. A person of ordinary skill in the art will recognize that additional ranges of transverse extent of the connecting segments within the explicit range above is contemplated and is within the present disclosure.

Figure 14:
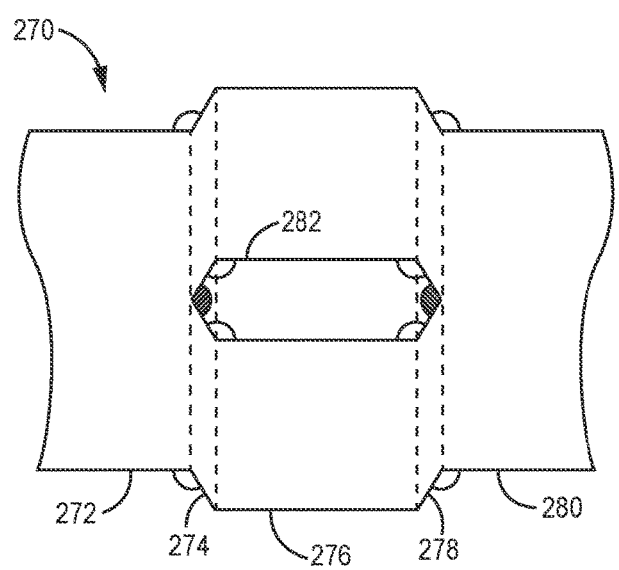
FIG. 14 is a fragmentary view of a single waggle section with the structure of FIG. 10 with the sections marked for contrast with the alternative embodiment of FIG. 13.

FIG. 14 depicts a portion of a transition section with one waggle 270 with slanted connections. Referring to the fragmentary view in FIG. 14, transition section portion 270 comprises profile-A segment 272, connecting segment 274, profile-B segment 276, connecting segment 278 and profile-A segment 280. Profile-B segment includes a rectangular portion of gap region 282, with triangular portions of gap region 282 extending into connecting segment 274 and connecting segment 278. Overall, gap region 282 has a hexagonal shape. In addition to the previously-mentioned improvement in managing constant cross-section, this also addresses the other two issues raised regarding the vertical connections of FIG. 13. It can be seen in FIG. 14 that all of the internal 90° angles can be opened up to say 110°-130°. This does create two new internal angles along the horizontal center of the inner gap, as shown by hashing in FIG. 14. However, as long as the opened angles are less than 135°, then these new interior angles will also be greater than 90°. Hence these structures fabricate more repeatable and leave greater flexibility in the process control to address other issues. Also noticeable in FIG. 14, there are no longer any vertical edges. Any small back-reflections off any of these edges are primarily directed away from the waveguide axis instead of back along the input, substantially reducing any likelihood of a back-reflection problem from these structures.

FIG. 15 depicts a simulated performance of a Y-branch splitter with a transition section described with respect to FIGS. 10 and 11. The simulations herein were performed with 10 wags. A corresponding device layout is depicted in FIG. 16 for facilitated viewing, which is not at a constant longitudinal scale; the waggled transition shows fewer cycles and is elongated compared to the other structures to better emphasize its structure. In this example, the transition is designed to the example parameters described earlier: refractive-index contrast is 1.5%, output waveguides are 4µ wide each, and the gap between the output waveguides is 2µ. In a particular simulated embodiment, a desirable solution is achieved with 10.5 cycles (counting the last transition from profile-A to profile-B as a half a cycle that continues with the split waveguides) with a cycle length of 7µ for a total length of the transition section of about 75µ. For this embodiment, the growth along the optical path of the profile-B sections and the shortening of the profile-A sections approximately compensate for each cycle so that the cycle length remains approximately constant, but other variations of the cycle length can be used. The waggled transition section replaces a transition section as shown in FIG. 4, where the input would taper from 8µ wide up to 10µ wide. For these parameters, that taper section would normally be about 200µ long, so the devices described herein also can reduce the footprint of the transition. Simulation results for this structure are depicted in FIG. 15. Earlier parts of the input taper are not shown for the simulation, but the optical intensity does not change significantly in the earlier parts of the taper. The described waggling transition sits between about 500 and 580µ along Z. If this is compared to FIGS. 3, 6 and 9, it can be recognized that this transition behaves much more like the ideal splitter, with the central peak in the input having a well-behaved splitting into two symmetrical peaks before coupling into the output waveguides. This behavior is further supported by the graph in 17 showing well-behaved and efficient coupling of about 98% of ideal into each output waveguide for the same structure.

Figure 18A:
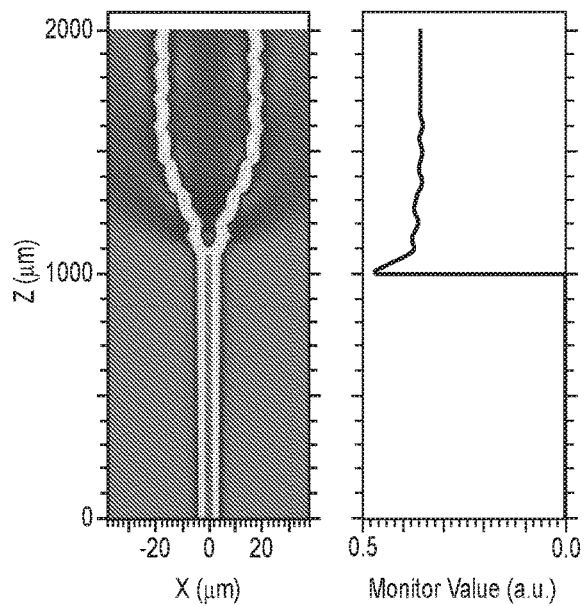
FIGS. 18A-18C is a set of simulation data with simulation field intensity plots and mode intensity plots summarized to provide side-by-side comparison.
Figure 18B:
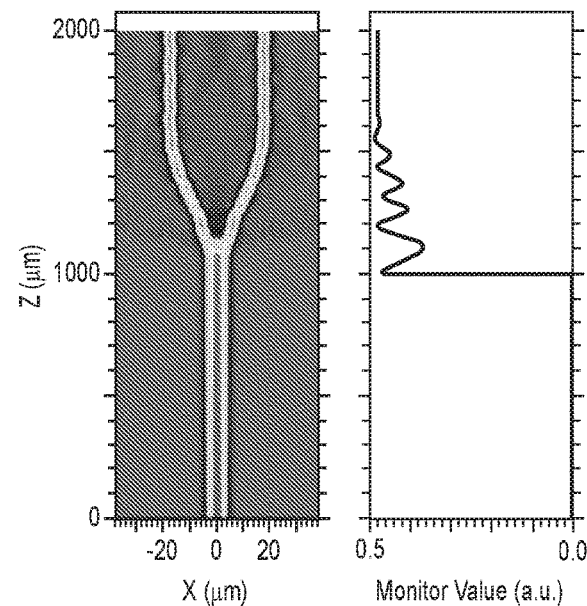
Figure 18C:
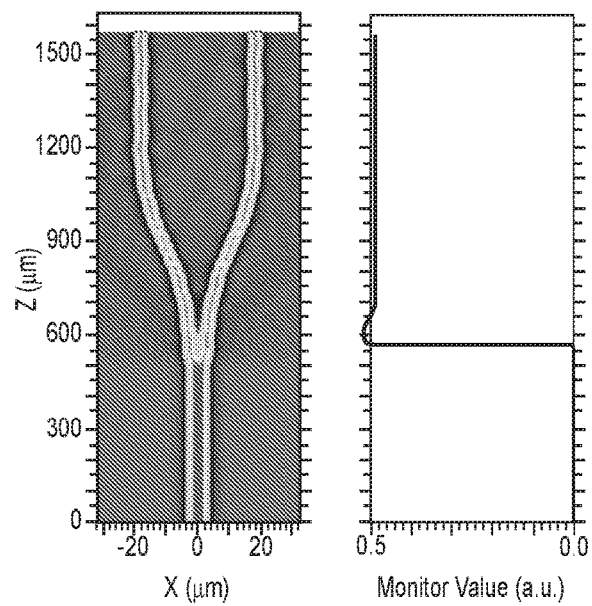

FIGS. 18A-18C assembles simulations and amplitude plots for the traditional embodiment of FIG. 4 (FIG. 18A), exemplary improvement of FIG. 7 (FIG. 18B), and exemplified waggled embodiment (FIG. 18C) for more direct comparison. These Figs. are reproduced from earlier figures, 18A from FIGS. 5 and 6, B from FIGS. 8 and 9 and C from FIGS. 15 and 17. The models used to generate FIG. 18B and FIG. 18C were each individually optimized for improved performance with respect to the specific general design. Note that one could combine both the connecting paths of FIG. 7 and a waggled transition, such as FIG. 10, since they are applied to different parts of the splitter. However, since the waggled transition already provides a clean separation and coupling to the output modes, the added connecting paths would not provide any significant benefit and may actually cause some additional scattering and loss of their own.

FIGS. 19A-19C provides another set of comparisons based on simulated propagation through the comparative structures. The plots in FIGS. 19A-19C show a cross section of the optical intensity at a variety of locations along the relevant area of the plane of the splitter. In FIG. 19A, simulation of the ideal (effectively unrealizable) splitter of FIG. 1 shows a well behaved and clean conversion from the centrally-peaked to the dual-peaked optical intensity function with a smooth dip between. This behavior is an indication that a straight wavefront is being approximately maintained through the transition. FIG. 19B shows the optical intensity function for the embodiment of FIG. 4. Referring to FIG. 19B, although a good fraction of the light is being coupled to the output waveguides, it can be seen that this is a struggle—a smooth bimodal shape is not being initially achieved and the corresponding wavefront correspondingly is not staying very straight. This behavior also indicates a higher sensitivity to process variations and wavelength variations, and presents significant challenges to designing in further improvements based on similar designs. Designs similar to FIG. 7 may still be suitable for a great many purposes, but it would be desirable to have better performance. The waggled transition design with parameters summarized above is simulated as described in relation to FIG. 16. Although the optical intensity behavior of FIG. 19C is not as ideal as the true ideal simulation of FIG. 19A, it is clearly much closer than observed in optical intensity FIG. 19B. The central peak splits smoothly into two symmetric peaks with a smooth dip between and very little scattering noise (ripples along the plotted intensity). This indicates that the wavefront is remaining approximately straight and the splitting of the peak is robust and stable. The behavior further indicates that the transition is less sensitive to wavelength variations, likely more tolerant of process variations, and possibly there is room for further efficiency improvements (though the remaining optical loss that may be recovered beyond this design point is quite minimal).

Figure 20:
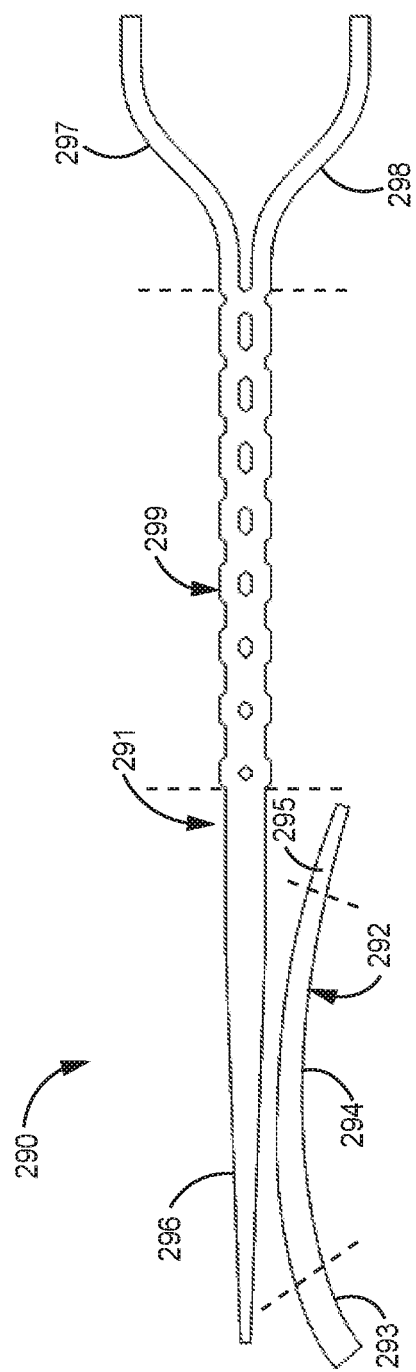
FIG. 20 is a top plan view of an effective 2×2 coupler/splitter with two input waveguides forming a directional optical coupler configured to couple a zero order mode in a curved coupled waveguide into a first order mode of a Y-splitter, which has a waggled transition section.

In some applications, higher-order waveguide modes in the input arm may be expected. FIG. 20 shows optical cores of a planar optical structure for introducing these modes. Above, the discussion of Y-splitter function has only considered the lowest order mode, in which the intensity is centrally peaked, or separated into two peaks but the intervening dip not touching zero until the output waveguides are sufficient separated. As used herein, the lowest order optical mode is referred to as a zero order mode since it has no zero-crossing, and the next order mode is referred to as a first order mode since it has one zero-crossing. The first order mode naturally has two lateral peaks, and the dip between them passes abruptly through zero intensity so that one peak is 180° out of phase with the other (i.e. negative amplitude). Referring to FIG. 20, a higher order splitter 290 comprises waggled Y-splitter 291 and curved coupled waveguide 292.

Curved coupled waveguide 292 tapers to a termination point, which generally drives the coupling of optical intensity into the adjacent coupled waveguide of waggled Y-splitter 291. Specifically, curved coupled waveguide 292 comprises an input waveguide section 293, a coupling waveguide section 294 identifiable by having significant coupling to Y-splitter 291, and terminating section 295, in which rough divisions are marked on the figure, although precise divisions of the sections is not significant for defining the structure or understanding its function. Waggled Y-splitter 291 comprises input waveguide section 296, first output waveguide section 297, second output waveguide section 298 and waggled transition section 299. Any of the various Y-splitter embodiments discussed above can be adapted for this device and are hereby incorporated into this discussion. Curved coupled waveguide 292 approaches input waveguide section 296 to form an adiabatic optical coupler. Curved coupled waveguide 292 below input waveguide section 296 in FIG. 20 couples light into the higher-order mode of the wider input waveguide section 296 of waggled Y-splitter 291. Specifically, light in the zero-order mode of curved coupled waveguide 292 can be efficiently coupled, e.g., adiabatically coupled, into the first-order mode of waggled Y-splitter 291. The adiabatic coupling of a curved single mode waveguide with a multimode waveguide in close proximity is described in published U.S. patent application 2005/0254750 to Narevicius, entitled "Method and Apparatus for Optical Mode Division Multiplexing," incorporated herein by reference. This relationship allows the structure of FIG. 20 to operate as an optical mixer, useful as an output coupler of an optical switch, optical modulator, or polarization-state splitter, as discussed further below. An optical mixer can split a single optical signal from either input equally between the outputs, but if signal is present on both inputs, the optical interference between those two signals can direct the total optical power predominantly towards one or the other of the outputs. For two inputs of equal intensity, the ratio between the maximum optical power that can be directed to a single output and the minimum optical power that can be directed to that output is called the 'extinction ratio'. Applications employing an optical mixer generally prefer as high an extinction ratio as possible. This means being able to achieve very close to zero light in an output when the two input signals have equal intensity and proper phase. According to the basic principles of interference, approximating that zero signal requires nearly-equal efficiency for splitting both of the individual modes. For structures as depicted in FIG. 20, it is desirable for the splitter to be able to split efficiently either mode (zero order mode or a first order mode).

Figure 21A:
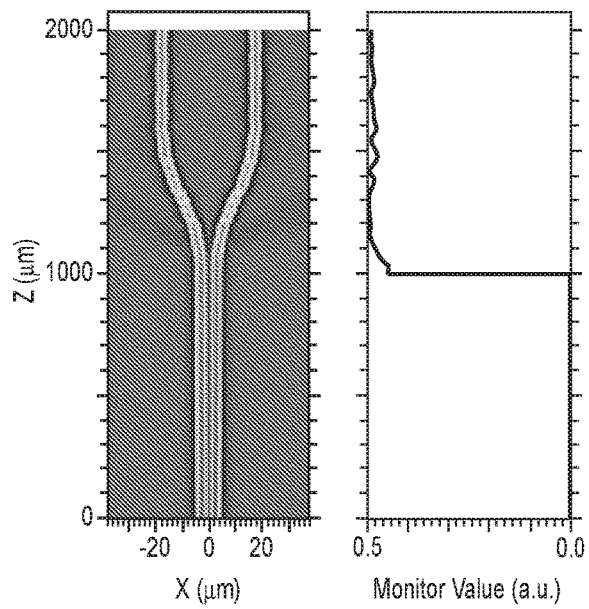
FIGS. 21A-21C is a set of simulation data with simulation field intensity plots and mode intensity plots obtained with a first-order-mode input optical signal to provide side-by-side comparison.
Figure 21B:
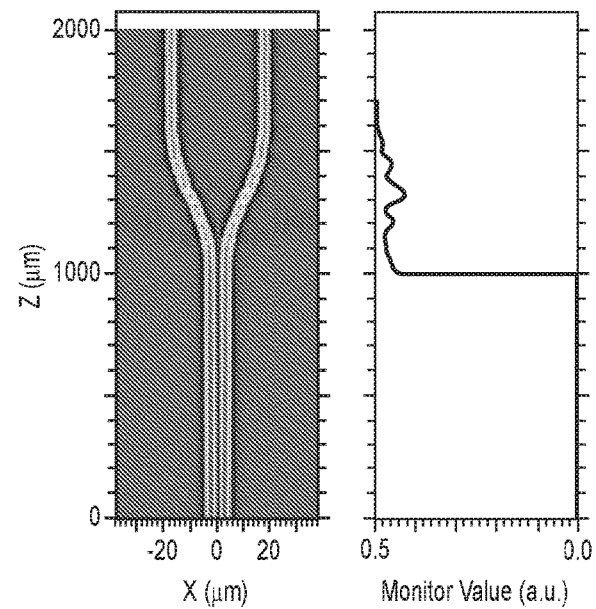
Figure 21C:
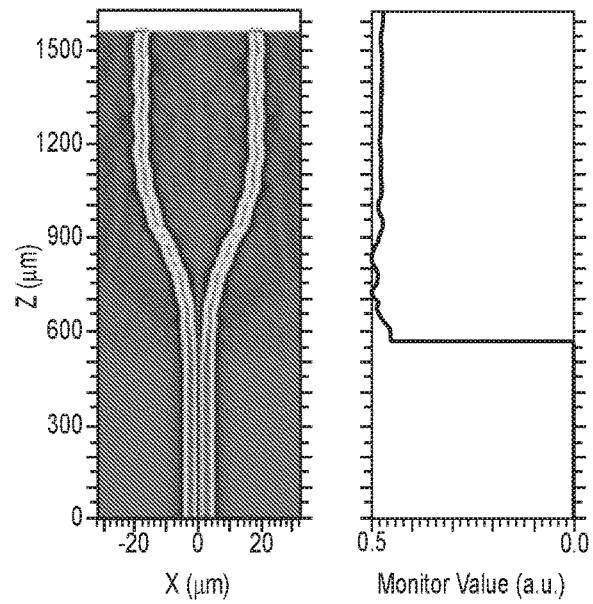

Splitting of the lowest-order mode has been well discussed above. FIGS. 21A-21C depicts the effectiveness of splitting with respect to the first-order mode in a 2×2 splitter embodiment with three different embodiments for the Y-splitter component. Since the power in the first-order mode is near zero along the center of the waveguide axis, the splitting is not significantly adversely affected by encountering a finite gap. The optical wave is already naturally separated into two peaks, and hence couples well to the output waveguides. FIG. 20 plot A shows that even with the Y-splitter embodiment of FIG. 4, the simple, practical Y-Branch splits this higher-order mode efficiently. FIG. 21B, the connecting paths of the Y-splitter embodiment of FIG. 7 help direct the remaining traces of the optical power into the output waveguides to provide even more effective coupling. FIG. 21C, the Y-splitter with the waggled transition actually performs somewhat worse on the higher-order mode. In fact it is less efficient than the Y-splitter of FIG. 4 for this mode. This result can be explained by noting that this design point was set to separate a centrally-peaked mode into two peaks. When presented with a mode that already has two peaks, it can over-compensate and the coupling loss increases. However, note that this reduced efficiency for the higher-order mode is not necessarily an impairment for certain embodiments. When making a high-isolation switch or polarization-state splitter, it is desirable that the splitting efficiency of the splitter be equal for each mode, not necessarily as high as possible. By adjusting the geometrical parameters of the waggled transition, the splitting efficiency of the modes can be made approximately equal and still very high. For instance, by making the two waveguides in profile-B (FIG. 11) slightly wider than half the width of profile-A (FIG. 11), one is designing away from the optimal efficiency for the zero-order mode, but towards the optimal efficiency of the first-order mode. Within a small range of design options, one can readily identify the crossover point where splitting of both modes is equally efficient. In some embodiments, the zero order mode and the first order mode can have splitting efficiencies within 1 percent of each other, in further embodiments within 0.5 percent of each other and in additional embodiments within 0.25 percent of each other. A person of ordinary skill in the art will recognize that additional ranges of efficiency differences within the explicit ranges above are contemplated and are within the present disclosure. No corresponding adjustments are known for the Y-splitter designs of FIGS. 4 and 7 such that the efficiency of the higher-order mode would be expected to always be higher than for the low-order mode, unless you make them both very bad, which is not a reasonable alternative.

With respect to operation of the 2×2 splitter/coupler of FIG. 20, input waveguide section 296 of Y-splitter 291 can include a zero order mode with a particular phase relationship with a zero order mode of curved waveguide 292. The zero order mode of curved waveguide 292 couples into a first order mode within Y-splitter 291, and the two optical signals can then interfere. If a zero order mode propagates from input waveguide section 296 and a first order mode couples into Y-splitter 291 from curved coupled waveguide 292, interference between the two modes concentrates the optical signal power towards one side or the other depending on the phase difference between the two inbound modes. This fundamental behavior is used effectively to route the resulting signal between the two outputs based on the phase relationship between the interfering signals. For example, the input signals into input waveguide section 296 and curved waveguide 292 can have the same phase such that the interfering signals then constructively interfere over one portion of the first order signal and destructively interfere over the other portion of the first order signal to result in an asymmetric signal across the transverse direction of the waveguide. The asymmetric signal then is aligned to proceed into only one of the output waveguide sections 297, 298. If the two signals in the input waveguide section 296 and the curved waveguide 292 are 180 degrees out of phase, the signals interfere with the constructive and destructive contributions reversed in space to form the opposite asymmetric signal, which is then aligned to enter the opposite output waveguide section 297, 298. Smaller degrees of phase misalignment can be used to adjust the amount of signal in each output waveguide based on the interference of the two signals combined in the input waveguide section 296. In this way, by adjusting the relative phase between two signals in the two output waveguides to provide a switching function which can be continuously adjusted between all of the signal in one output waveguide section or the other output waveguide section, e.g., variable optical attenuation and/or effective switching between one output or the other.

If the optical signals convey polarization dependent information, the phases of the distinct polarization separately interfere in the combined signal with the device of FIG. 20. In this way, the different polarization states can be directed into different output waveguide sections if the different polarizations have different phases relative to each other such that the opposite phases interfere differently for the opposite polarizations. If the phase difference between the inputs, and hence modes, for one polarization is 180 degrees out of phase relative to the other polarization, the device of FIG. 20 can then be used as the final mixer of a polarization beam splitter. The switching functions whether or not based on polarization can be desirably accomplished with the device of FIG. 20 is the zero order modes and the first order modes are split by the waggled Y-splitter of FIG. 20 with approximately the same efficiency since then this leads to higher-extinction-ratio performance in the switching function.

Figure 22:
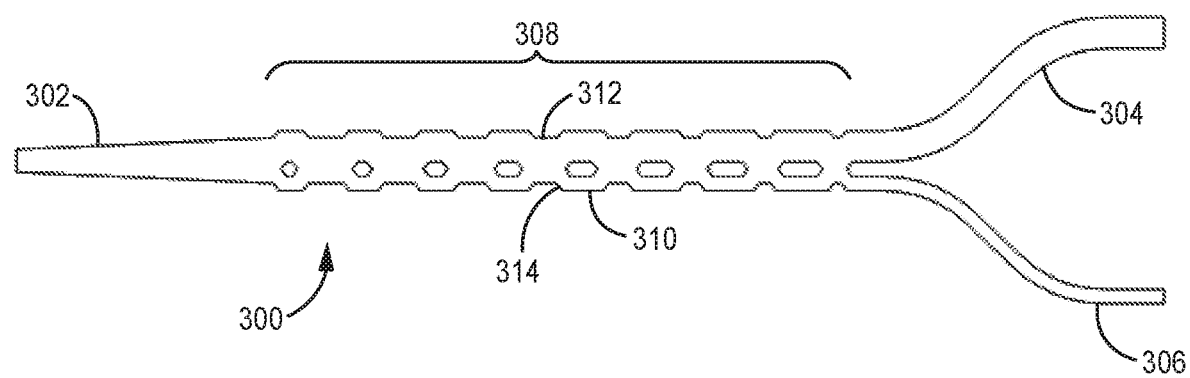
FIG. 22 is a top plan view of an asymmetric Y-splitter with a waggled transition section generally suitable with the example parameters described herein for splitting up to about 80:20 between the two output waveguide sections.

In some applications, optical intensity splitting ratios other than symmetric 50%/50% may be desired. FIG. 22 depicts an asymmetric configuration based on the concepts presented herein that can be used with practical configurations to create splitters between 50%/50% and about 80%/20% based on the example parameters used herein and described above. With different parameters, a modified range of asymmetric splitting with this structure may be possible. With the broken symmetry, optical splitters have been difficult to realize with any of the known methods based on the Y-splitter structures. Asymmetric splitter designs based on the general Y-splitter designs tend to be very sensitive to wavelength changes and process variations, often too much so for practical applications. Since the waggled transition emulates the behavior of an ideal splitter of FIG. 1, the wavelength dependence and process tolerance can be substantially improved with practical designs.

Referring to FIG. 22, asymmetric splitter 300 comprises input section 302, major output section 304, minor output section 306 and transition section 308. Major output section 304 has a greater width than minor output section 306. To achieve the optical intensity splitting, the width of the output waveguides are asymmetrical adjacent to the transition region, and the gap is correspondingly asymmetrically positioned. The ratios of the asymmetric widths of the output waveguides may be roughly selected based on the desired ratios of the output optical intensity, but simulations or empirical evaluation can adjust these selections to achieve the desired optical output. Generally, to achieve a lower amount of split optical intensity, the gap occurs lower in the transition section as the width of the lower output waveguide decreases relative to the upper. While changing the ratio of the widths accordingly adjusts the optical splitting performance, simulations and/or empirical adjustment can be used to achieve the desired degree of splitting. The width of the major output waveguide is generally between about w and about 2w. The width of the minor output waveguide, and hence the position of the gap, cannot be reduced below the minimum width supported by the process design rules, for instance about 2-microns for the process of the examples herein. To accomplish the splitting of lower amounts of optical intensity in the minor output section, the entire output waveguide profile can be shifted relatively lower as described in embodiments below. Referring to FIG. 22, input waveguide section 302 tapers from an initial width of w to a width of $w_1+w_2+g$, where $w_1$ is the width of major output section 304, $w_2$ is the width of minor output section 306, and g is the gap. Generally, $w_1/w_2$ can be at least about 1.1, i.e., $w_1$ is 10% greater than $w_2$. In some embodiments, $w_1/w_2$ can range from about 1.1 to 8, in further embodiments from about 1.2 to about 6 and in additional embodiments from about 1.3 to about 4. A person of ordinary skill in the art will recognize that additional ranges of optical splitting and width ratios within the explicit ranges above are contemplated and are within the present disclosure.

In this embodiment, transition section 308 comprises 8 segments of profile-B 310 (one representative segment labeled in the figure) and 8 segments of profile-A 312 (one representative segment labeled in the figure), which have widths of $w_1+w_2$. Profile-B segments 310 have profiles with an upper waveguide of width $w_1$ and a lower waveguide portion of width $w_2$ separated by a gap g. Connecting segments 314 connect profile-A segments 312 with profile-B segments 310. The various alternative embodiments of the waggles described in detail above for the transition section of FIG. 10 generally are also applicable to appropriate embodiments of the asymmetric splitter of FIG. 22, and are incorporated here without explicit reproduction of the language with the understanding that it is as if the language were reproduced here. Specifically, the discussions above relevant to this asymmetric embodiment include, but are not limited to, the discussion above of the number of profile-A and profile-B segments in a transition section (e.g., 3-100), changes in the longitudinal extent along the optical path of the profile-A segments and profile-B segments from the input end to the output end of the transition section (e.g., $q_0+n\cdot dq$), the comparison of the transverse width of the core material at the profile-A segments and profile-B segments (e.g., approximately equal or ±25%), the nature of the connecting segments (e.g., presence or absence as well as shape and size), and other appropriate parameters.

Figure 23:
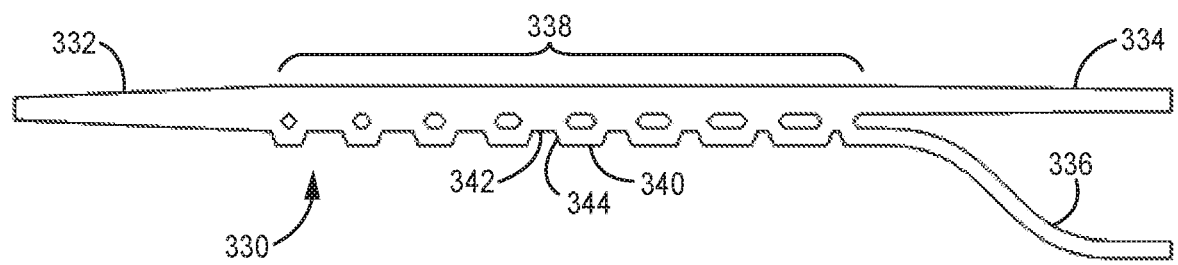
FIG. 23 is a top plan view of an asymmetric Y-splitter with the output waveguide sections shifted downward relative to the input waveguide section to provide for approximate alignment of an edge of the major output waveguide section with an edge of the transition section and the edge of the end of the input waveguide section to provide a low tap function for the minor output waveguide section.
Figure 24:
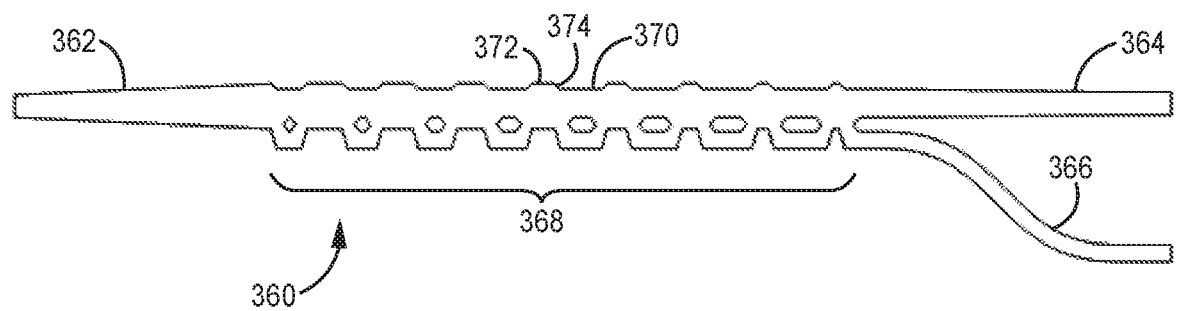
FIG. 24 is a top plan view of an asymmetric Y-splitter with the output waveguide section shifted downward further relative to the structure of FIG. 23 with a corresponding change to the waggled transition section to provide for a lesser coupling into the tap.

In order to get small fractions of the optical signal reliably coupled into the minor output waveguide, it has been discovered that the output waveguides should be shifted away from the centerline of the input waveguide. As the output waveguides are shifted away from the centerline of the input waveguides, the edges of the profile-A segments of the transition region are correspondingly shifted to maintain alignment with the output waveguides. In the orientation used in the figures, this shifting results in a downward shift of the edges, with the upper bump getting smaller and the lower bump getting larger relative to the profile-B segments. As the shifting continues the upper bump can vanish so that the upper edge of the profile-A segments and profile-B segments align (FIG. 23), and with even more shifting the upper bump becomes a recess with the upper edge of profile-B segments shifted down relative to the lateral edge of profile-A segments (FIG. 24). Along with the shifting of the output waveguide position, the relative widths of the output waveguides can also be adjusted. A more frequently sought after type of asymmetric splitting is to split off a smaller fraction of the light, usually 10% or less, to use as a monitor signal while the large majority of the optical signal is routed forward through a single waveguide to the subsequent optical circuitry. The structure within this description of a small splitting device is generally referred to as an optical 'tap', the minor output waveguide being an optical tap waveguide. Embodiments of optical splitters related to applications of the waggled splitters to low-percentage optical taps are depicted in FIGS. 23 and 24. Intermediate shifted output waveguides between the embodiments of FIG. 22 and FIG. 23 are clear based on the description above with all of the configuration parameters continuously adjustable within processing capabilities.

For example, if the output waveguides are shifted far enough down, the upper edge of the output profile can align to the upper edge of the input waveguide, making the upper edge of the waggled transition approximately straight along its length as in optical tap 330 of FIG. 23. This represents the type of configuration that might be used to make a 5%-10% tap. The widths of the major output waveguide and the minor output waveguide can be adjusted similarly to the output waveguide widths of FIG. 22. Similarly, changing the amount of shift of the output waveguides as well as the ratio of the widths adjusts the optical splitting performance, and simulations and/or empirical adjustment can be used to achieve the desired degree of splitting. In alternative or additional embodiments, the bump up at profile-B segments for the lateral edge relative to a profile-A segment can range continuously from g/2 (FIG. 22) to 0 (FIG. 23) to negative values (FIG. 24), as selected to provide a desired asymmetric split. Optical tap 330 comprises input waveguide section 332, output waveguide section 334, waveguide tap 336 and transition section 338. Transition section 338 comprises waggles with 8 profile-B segments 340 (one representative profile-B segments labeled) and 8 profile-A segments 342 (one representative profile-A section labeled) with connecting segments 344 connecting profile-A segments 342 and profile-B segments 340. Input waveguide section 332 generally tapers from an initial width of w to a width of $w_o+w_t$, where $w_o$ is the width of the primary output waveguide 334 and $w_t$ is the width of waveguide tap 336. Generally, $w_0$ is between w and 2w. Profile-B segments generally have an upper waveguide portion with a width $w_o$ a lower waveguide portion with a width $w_t$ separated by a gap g. Typically, the width of the upper waveguide would taper back down from $w_o$ to w beyond the splitting region. Since the upper edge of the waveguide is approximately straight, the shift of the waggle in profile-B segments is only along the lower edge in this embodiment. Of course, the reference to upper and lower is only for convenient reference to the drawing and is not intended to imply any actual orientation in space, and the device can be oriented in the flipped over configuration for taps to carry the signal in the other direction relative to the main optical waveguide. Also, the general description of the alternative embodiment of the waggle structure above for the waggle transition in FIG. 10 can be correspondingly applied to the embodiment of FIGS. 21A-21C as appropriate for this embodiment and the above text is as if written here for alternative embodiments. Specifically, the discussions above relevant to this asymmetric embodiment include, but are not limited to, the discussion above of the number of profile-A and profile-B segments in a transition section (e.g., 3-100), changes in the longitudinal extent along the optical path of the profile-A segments and profile-B segments from the input end to the output end of the transition section (e.g., $q_0+\_n\cdot dq$), the comparison of the transverse width of the core material at the profile-A segments and profile-B segments (e.g., approximately equal or ±25%), the nature of the connecting segments (e.g., presence or absence as well as shape and size), and other appropriate parameters.

To make a smaller tap fraction, the output waveguides need to be offset even further from the centerline of the input waveguide. In such a configuration, the upper edge of the output profile of the major output waveguide may be below the upper edge of the input profile. In that configuration, the upper edge may actually move inward where the transition wags to the wider profile as shown in the optical tap 360 of FIG. 24. Generally, the degree of dipping can be selected to provide the desired tap output. This is the type of configuration that generally could be used to make taps of less than about 5% optical intensity. Waveguide taps with small tapping ratios (e.g. below 10%) have typically been made using weak resonant coupling, which is fundamentally wavelength dependent. A tap based on weak resonance coupling means that the tapping ratio generally varies significantly over the desired range of operating wavelengths, and there is a desire to be able to make a more stable small ratio tap. The types of taps depicted in FIGS. 23 and 24 should be able to make such small-ratio taps with significantly improved wavelength stability. With respect to these tap designs, to Applicant's knowledge there is no corresponding idealized design based on the symmetric splitter of FIG. 1. To Applicant's knowledge, no such tap designs exist based on the splitter concepts of FIGS. 4 and 7.

Referring to FIG. 24, optical tap 360 comprises input waveguide section 362, output waveguide section 364, waveguide tap 366 and transition section 368. Transition section 368 comprises waggles with 8 profile-B segments 370 (one representative profile-B segments labeled) and 8 profile-A segments 372 (one representative profile-A segment labeled) with connecting segments 374 connecting profile-A segments 372 and profile-B segments 370. Input waveguide section 362 generally tapers from an initial width of w to a width of about $w_o+w_t$, where $w_o$ is the width of the primary output waveguide 364 and $w_t$ is the width of waveguide tap 366. Profile-B segments generally have an upper waveguide section with a width $w_o$, a lower waveguide section with a width $w_t$ separated by a gap, g. Since the lateral upper edge of the output waveguide is below the lateral upper edge of the end of input waveguide 362, the waggles have a dip at the top of profile-B sections rather than a bump, and the lower extension of the waggles have lateral edges that correspondingly extend further down relative to the lower edge of the end of input waveguide 362. Correspondingly the gaps at the profile-B sections are shifted lower in the embodiment of FIG. 24 relative to the embodiment of FIG. 23. Again, for the embodiment of FIG. 24, the reference to upper and lower is only for convenient reference to the drawing and is not intended to imply any actual orientation in space, and the device can be oriented in the flipped over configuration for taps to carry the signal in the other direction relative to the main optical waveguide. Also, the general description of the alternative embodiment of the waggle structure above for the waggle transition in FIG. 10 can be correspondingly applied to the embodiment of FIG. 24 as appropriate for this embodiment and the above text is as if written here for corresponding alternative embodiments. Specifically, the discussions above relevant to this asymmetric embodiment include, but are not limited to, the discussion above of the number of profile-A and profile-B segments in a transition section (e.g., 3-100), changes in the longitudinal extent along the optical path of the profile-A segments and profile-B segments from the input end to the output end of the transition section (e.g., $q_0+n\cdot dq$), the comparison of the transverse width of the core material at the profile-A segments and profile-B segments (e.g., approximately equal or ±25%), the nature of the connecting segments (e.g., presence or absence as well as shape and size), and other appropriate parameters.

For the asymmetric splitters of FIGS. 22-24, the output waveguide sections initially have widths adjacent the transition section selected to provide a desired optical intensity splitting. Following the splitting, the output waveguide sections can gradually taper to have a width w to support the signal for transmission longer distances. For optical taps, the taps can be directed to an optical detector or the like after a short distance that may make a taper for the tap output section superfluous.

The principles of the waggled transition are not limited to 1×2 transitions. FIG. 25 shows application of the invention to a 1×3 splitter. For this embodiment, a 1×3 splitter 400 comprises input waveguide section 402, first output waveguide section 404, second output waveguide section 406, third waveguide section 408 and transition section 410. Transition section 410 is depicted with 6 alternating segments with profile-A and profile-B. Connecting segments are shown between each profile-A and profile-B segment. To simplify the drawing, one profile-A segment 414 and one profile-B segment 412 are labeled in FIG. 25 along with adjacent connecting segments 416, 418. Profile-B segment 412 has three waveguide segments (with widths $w_1$, $w_2$, and $w_3$ separated from each other by a gap, g). Profile-A segment has a continuous core with a width of approximately $w_1+w_2+w_3$.

FIG. 26 shows application to a 2×3 mixer 430. Optical mixer 430 comprises 2 input waveguide sections 432, 434, three output waveguide sections 436, 438, 440 and transition section 442. Transition section 442 comprises as shown in the FIG. 5 profile-A segments and 5 profile-B segments with corresponding connecting segments. To simplify the drawing, one profile-A segment 446, one profile-B segment 444 and corresponding connecting segments 448, 450 are labeled. Profile-A segment 446 has three waveguide segments with widths $w_1$, $w_2$, $w_3$ separated by gaps, g. Profile-A segments have two waveguide segments with widths $w_4$, $w_5$ separated by a gap, g. Nominally, the following condition is approximately satisfied: w1+w2+w3=w4+w5. Furthermore, for balanced coupling, w1=w3 and w4=w5.

The gaps in the transition sections of FIGS. 25 and 26 are shown with hexagonal shapes similar to those of FIG. 10. However, for these embodiments, the hexagonal gaps do not correspond with connecting segments having the core material with the same later width as the lateral width of core in the profile-A segments and the profile-B segments. According to simulations, the change in the lateral width of the core material in the connecting segments does not influence the performance significantly, and the hexagonal shaped gaps generally provide for convenient processing. Generally, other reasonable gap shapes can be used for the various embodiments. The embodiments in FIGS. 25 and 26 can have different numbers of profile-A and profile-B segments as described above for the other embodiments. Also, the general description of the alternative embodiment of the waggle structure above for the waggle transition in FIG. 10 can be correspondingly applied to the embodiment of FIGS. 25 and 26 as appropriate for this embodiment and the above text is as if written here for corresponding alternative embodiments. Specifically, the discussions above relevant to this asymmetric embodiment include, but are not limited to, the discussion above of the number of profile-A and profile-B segments in a transition section (e.g., 3-100), changes in the longitudinal extent along the optical path of the profile-A segments and profile-B segments from the input end to the output end of the transition section (e.g., $q_0+n \cdot dq$), the comparison of the transverse width of the core material at the profile-A segments and profile-B segments (e.g., approximately equal or ±25%), the nature of the connecting segments (e.g., presence or absence as well as shape and size), and other appropriate parameters.

The materials for forming the planar devices described herein within a PLC can be deposited on a substrate using CVD, variations thereof, flame hydrolysis or other appropriate deposition approach. Suitable substrates include, for example, materials with appropriate tolerance of higher processing temperatures, such as silicon, ceramics, e.g. silica or alumina, or the like. In some embodiments, for the formation of the PLC on the substrate, suitable silicon dioxide precursors can be introduced, and a silica glass can be doped to provide a desired index of refraction and processing properties. Similar, deposition and doping can be performed for other optical materials. The patterning can be performed with photolithography or other suitable patterning technique. For example, the formation of a silica glass doped with Ge, P and B based on plasma enhanced CVD (PECVD) for use as a top cladding layer for a PLC is described in U.S. Pat. No. 7,160,746 to Zhong et al., entitled "GEBPSG Top Clad for a Planar Lightwave Circuit," incorporated herein by reference. Similarly, the formation of a core for the optical planar waveguides is described, for example, in U.S. Pat. No. 6,615,615 to Zhong et al., entitled "GEPSG Core for a Planar Lightwave Circuit," incorporated herein by reference.

The devices described herein can be generally integrated with additional components within a planar lightwave circuit, although they alternatively can be incorporated as a single device within a planar lightwave circuit to connection to optical fibers and/or additional separate planar lightwave circuits using appropriate connectors.

The present invention has been described in terms of application to specific configurations and orientations of splitters, mixers, and taps, but a skilled practitioner will readily see that it is applicable the full range of such devices and for optical propagation in either direction. The descriptions are meant to exemplify but not limit the invention.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understood that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. An asymmetric optical junction comprising:
an input waveguide section, a first output waveguide section, a second output waveguide section and a transition waveguide section connecting the input waveguide section and the output waveguide sections, wherein the first output waveguide section has a width perpendicular to the optical path that is at least about 10% greater than the corresponding width of the second output section and wherein the transition waveguide section comprises alternating gapped segments and ungapped segments along the optical path, the gapped segments having transverse to the optical path waveguide cores corresponding to the two output waveguide sections separated by gaps in the optical core, and the ungapped segments having transverse continuous core.

2. The asymmetric optical junction of claim 1 wherein the waveguide sections comprise silica glass.

3. The asymmetric optical junction of claim 1 wherein less than 10% of optical intensity transmitted from the input waveguide section to the transition waveguide section propagates through the second output waveguide section.

4. The asymmetric optical junction of claim 1 wherein the transition section comprises 6 to 25 gapped segments and 6 to 25 ungapped segments.

5. The asymmetric optical junction of claim 1 wherein a connecting segment connects a gapped segment to an adjacent ungapped segment and wherein the gap extending across a gapped segment and two adjacent connecting segments forms approximately a hexagon.

6. The asymmetric optical junction of claim 1 wherein the lateral edges of the gapped segments are symmetrically positioned relative to the center of the ungapped segments perpendicular to the optical path.

7. The asymmetric optical junction of claim 1 wherein the lateral edges of the gapped segments are asymmetrically positioned relative to the center of the ungapped segments perpendicular to the optical path.

8. The asymmetric optical junction of claim 7 wherein the transition section is approximately linear over one lateral edge.

9. The asymmetric optical junction of claim 7 wherein the lateral edges of the gapped region have one edge that forms a recess relative to the lateral edge of the ungapped segment and one edge that forms a projection relative to the other lateral edge of the ungapped segment.

10. The planar waveguide junction of claim 1 wherein the input section has a constant width segment along an optical path prior to and optically connected to a taper segment where the core widens and further along the optical path is connected to the transition section and wherein the gap is from about 0.25w to about 0.9 w, where w is the transverse extent perpendicular to the optical path of the input waveguide core along the constant width segment prior to the taper segment connected to the transition section.

11. The planar waveguide junction of claim 1 wherein all of the ungapped segments have transverse continuous core having a total width within ±25% of the total sum of transverse width of the core at any of the gapped segments as well as within ±25 of any of the other ungapped segments.

12. The planar waveguide junction of claim 1 wherein all of the ungapped segments have transverse continuous core having a total width within ±10% of the total sum of transverse width of any of the core at the gapped segments.

13. The planar waveguide junction of claim 1 wherein all of the ungapped segments have transverse continuous core having a total width within ±10% of any of the other ungapped segments and corresponding to the input waveguide section.

14. The planar waveguide junction of claim 1 wherein all of the ungapped segments have transverse continuous core have total widths that are approximately equal to each other.

15. The planar waveguide junction of claim 1 wherein all of the ungapped segments have transverse continuous core approximately equal to the total sum of transverse width of the core at the gapped segments.

16. The planar waveguide junction of claim 1 wherein extent of the alternating segments in the propagation direction is from about 2 times the gap to about 30 times the gap.

* * * * *

UNITED STATES PATENT AND TRADEMARK OFFICE
CERTIFICATE OF CORRECTION

PATENT NO. : 11,061,187 B2  
APPLICATION NO. : 16/407779  
DATED : July 13, 2021  
INVENTOR(S) : Anthony J. Ticknor and Brian R. West Page 1 of 1

It is certified that error appears in the above-identified patent and that said Letters Patent is hereby corrected as shown below:

On the Title Page

Column 1, Item (51), under "Int. Cl.", Lines 4-6, delete
"*G02B 6/10*    (2006.01)
*G02B 6/125*   (2006.01)
*G02B 6/122*   (2006.01)" and insert -- *G02B 6/10*   (2006.01) --, therefor.

On Page 2, Column 1, Item (51), under "Int. Cl.", Lines 1-2, delete
"*G02B 6/126*   (2006.01)
*G02B 6/12*    (2006.01)".

In the Claims

In Column 24, Claim 10, Line 4, delete "0.9 w," and insert -- 0.9w, --, therefor.

In Column 24, Claim 11, Line 12, delete "±25" and insert -- ±25% --, therefor.

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*